United States Patent
Hoshino et al.

(10) Patent No.: US 7,425,990 B2
(45) Date of Patent: *Sep. 16, 2008

(54) MOTION CORRECTION DEVICE AND METHOD

(75) Inventors: Takaya Hoshino, Saitama (JP); Kazuhiko Nishibori, Kanagawa (JP); Toshio Sarugaku, Chiba (JP); Masuyoshi Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 637 days.

This patent is subject to a terminal disclaimer.

(21) Appl. No.: 10/521,304

(22) PCT Filed: May 12, 2004

(86) PCT No.: PCT/JP2004/006691

§ 371 (c)(1),
(2), (4) Date: Jan. 14, 2005

(87) PCT Pub. No.: WO2004/102963

PCT Pub. Date: Nov. 25, 2004

(65) Prior Publication Data

US 2005/0264692 A1  Dec. 1, 2005

(30) Foreign Application Priority Data

May 16, 2003  (JP) .............................. 2003-139124

(51) Int. Cl.
*H04N 5/14* (2006.01)
*H04N 7/01* (2006.01)
*H04N 9/64* (2006.01)
*H04N 11/20* (2006.01)
*G06K 9/32* (2006.01)
*G06K 9/40* (2006.01)

(52) U.S. Cl. .................. 348/441; 348/443; 348/447; 348/459; 348/699; 348/700; 348/452

(58) Field of Classification Search ................. 348/441, 348/443, 447, 459, 699, 700, 452; 382/260–262, 382/300
See application file for complete search history.

(56) References Cited

U.S. PATENT DOCUMENTS 4,771,331 A   9/1988 Bierling et al.

(Continued)

FOREIGN PATENT DOCUMENTS

EP   0 236 519   9/1987

(Continued)

*Primary Examiner*—Brian P. Yenke
(74) *Attorney, Agent, or Firm*—Frommer Lawrence & Haug LLP; William S. Frommer; Ellen Marcie Emas

(57) ABSTRACT

To realize a motion compensation device capable of more appropriately compensating the movement of a video signal subjected to double-speed conversion. A motion vector between an image of a current field in a double-speed-converted video signal and an image of a reference field that is one frame or two frames later is detected, the pixels of the current field are shifted based on the motion vector and the pixels of the reference field are shifted in an opposite direction based on the motion vector. Then simple averaging or weighted average according to the shift amount is performed on the pixels of the current field and the pixels of the reference field to compensate the current field, thereby being capable of compensating the movement between fields so as to be much smoother than conventional cases.

19 Claims, 17 Drawing Sheets

U.S. PATENT DOCUMENTS

| | | | |
|---|---|---|---|
| 5,532,750 A | 7/1996 | De Haan et al. | |
| 6,240,211 B1 | 5/2001 | Mancuso et al. | |
| 6,532,265 B1 | 3/2003 | Van der Auwera et al. | |
| 6,947,094 B2 * | 9/2005 | Hoshino et al. | 348/441 |
| 7,050,108 B2 * | 5/2006 | Nishibori et al. | 348/459 |
| 7,116,372 B2 * | 10/2006 | Kondo et al. | 348/448 |
| 7,154,556 B1 * | 12/2006 | Wang et al. | 348/452 |
| 7,187,417 B2 * | 3/2007 | Honda et al. | 348/459 |
| 7,215,377 B2 * | 5/2007 | Hoshino et al. | 348/452 |
| 7,221,043 B1 * | 5/2007 | Silverbrook | 257/676 |
| 7,295,245 B2 * | 11/2007 | Ha | 348/452 |
| 7,308,153 B1 * | 12/2007 | Wang | 382/262 |
| 7,327,397 B2 * | 2/2008 | Aoyama et al. | 348/441 |

FOREIGN PATENT DOCUMENTS

| | | |
|---|---|---|
| EP | 0 542 259 | 5/1993 |
| EP | 0 675 643 | 10/1995 |
| EP | 0 874 523 | 10/1998 |
| EP | 1 303 136 | 4/2003 |
| JP | 62-213392 | 9/1987 |
| JP | 5-137122 | 6/1993 |
| JP | 6-500910 | 1/1994 |
| JP | 8-84293 | 3/1996 |
| JP | 10-501953 | 2/1998 |
| JP | 11-168703 | 6/1999 |
| JP | 11-298861 | 10/1999 |
| WO | WO 93/00773 | 1/1993 |
| WO | WO 96/33571 | 10/1996 |

* cited by examiner

PRIOR ART

MOTION CORRECTION DEVICE AND METHOD

TECHNICAL FIELD

This invention relates to a motion compensation device and method and is suitably applied to a case of performing motion compensation on a video signal subjected to double-speed conversion.

BACKGROUND ART

When a television receiver displays images of a relatively low refresh rate, such as a PAL (Phase Alternate Line) signal of 50 fields per second, a phenomenon called screen flicker occurs.

By doubling the field frequency from 50 fields per second to 100 fields per second (hereinafter, this conversion technique is called a field doubling technique), the television receiver can reduce the screen flicker.

FIG. 7 shows a television receiver 100 adopting the above field doubling technique. For example, an input video signal S1 of 50 fields per second, such as a PAL signal, is input to a field doubling circuit 101.

A double-speed conversion unit 102 of the field doubling circuit 101 converts a scanning method of the input video signal S1 from interlace scanning (interlace scanning) to progressive scanning (noninterlace scanning) to create an intermediate video signal S2 of 50 frames per second, and writes this in an image memory 103. Then the double-speed conversion unit 102 reads the intermediate video signal S2 from the image memory 103 at a double speed of writing to double the field frequency of the intermediate video signal S2 to 100 fields per second, changes the scanning method from the progressive scanning to the interlace scanning, and inputs the created double-speed video signal S3 to a CRT (Cathode Ray Tube) 104.

At this time, the CRT 104 is receiving a horizontal/vertical serrate wave S4 of 100 fields per second from a horizontal/vertical deflection circuit 105, and displays the double-speed video signal S3 at 100 fields per second based on the horizontal/vertical serrate wave S4.

FIG. 8 shows a positional relation between fields and scanning lines of a video signal before and after being subjected to the above-described field double-speed conversion. A horizontal axis represents time and a vertical axis represents a vertical direction of a screen. Each white circle represents a scanning line. Reference numerals 1a, 1b, 2a, 2b, . . . shown in FIG. 8(A) represent field numbers, numerals 1, 2, . . . represent frame numbers, and a and b represent an odd field and an even field.

The double-speed conversion unit 102 (FIG. 7) of the field doubling circuit 101 first doubles the number of scanning lines of a field 1a of the input video signal S1 comprising an interlace image shown in FIG. 8(A) (progressive conversion), thereby creating a frame 1a shown in FIG. 8(B). Similarly, the double-speed conversion unit 102 sequentially performs the progressive conversion on the fields 1b, 2a, 2b, . . . of the input video signal S1 to create frames 1b, 2a, 2b, . . . , thereby creating an intermediate video signal S2 of a progressive image of 50 frames per second.

The double-speed conversion unit 102 writes the frame 1a shown in FIG. 8(B) in the image memory 103, and reads it every other scanning line. At this time, the double-speed conversion unit 102 first reads the odd-numbered scanning lines of the frame 1a to create a field 1a shown in FIG. 8(C). Then 1/100 second later, the unit 102 reads the even-numbered scanning lines of the frame 1a to create a field 1a' shown in FIG. 8(C). In this way, the double-speed conversion and the interlace conversion can be performed.

Similarly, the double-speed conversion unit 102 sequentially performs the double-speed conversion and the interlace conversion on the frames 1b, 2a, 2b, . . . of the intermediate video signal S2 to create fields 1b, 1b', 2a, 2a', 2b, 2b', . . . , thereby creating a double-speed video signal S3 of an interlace image of 100 fields per second.

As described above, the double-speed conversion unit 102 of the field doubling circuit 101 doubles the field frequency of the input video signal S1 from 50 fields per second to 100 fields per second, so as to suppress screen flicker.

The fields 1a and 1a' of the double-speed video signal S3 shown in FIG. 8(C) are both fields created from the field 1a of the input video signal Si shown in FIG. 8(A). Similarly, the fields 1b and 1b', the fields 2a and 2a', fields 2b and 2b', . . . of the double-speed video signal S3 are fields created from the same fields of the input video signal S1.

A movement of an image subjected to the double-speed conversion will be described with reference to FIG. 9. In FIG. 9, a vertical axis represents time and a horizontal axis represents a horizontal direction of a screen. An entity 110 on an image moves from the left to the right of the screen with time.

In the input video signal S1 shown in FIG. 9(A), the entity 110 smoothly moves in the right direction between fields. In the double-speed video signal S3 shown in FIG. 9(B), on the other hand, the entity 110 is displayed at the same position in the fields 1a and 1a' because the fields are created from the same field. Then since the next field 1b is created from a different field, the entity 110 moves greatly from the field 1a' to the field 1b.

Similarly, since the fields 1b and 1b', the fields 2a and 2a', the fields 2b and 2b' are created from the same fields, the entity 110 moves greatly from the field 1b' to the field 2a, and from the field 2a' to the field 2b.

Therefore, the double-speed video signal S3 subjected to the double-speed conversion has a problem in that moving image cannot be displayed smoothly.

In a case of displaying a cinema film composed of still images of 24 frames per second, on a normal television receiver, the cinema film is converted into a video signal with so-called telecine conversion.

In this case, as shown in FIG. 10(A), in an input video signal S1 of a film material created by performing the telecine conversion on the cinema film, fields 1a and 1b, fields 2a and 2b, . . . are created from the same segments of the film with the telecine conversion. Therefore, in a double-speed video signal S3 (FIG. 10(B)) created by performing the double-speed conversion on the input video signal S1, four fields 1a, 1a', 1b and 1b' are created from the same segment. Similarly, four fields 2a, 2a', 2b, 2b' are created from the same segment.

Therefore, in the double-speed video signal S3 shown in FIG. 10(B), an entity 110 is displayed at the same place in the four fields 1a to 1b', and moves greatly when shifting to the next field 2a.

As a result, the double-speed video signal S3 created by performing the double-speed conversion on the input video signal S1 for the film material has a problem in that a movement of an moving image is considerably non-smooth.

To solve the above non-smooth movement problem of a double-speed video signal, a motion compensation method has been proposed to realize smooth movement between fields by detecting motion vectors of an image and shifting the image with the motion vectors (for example, refer to patent reference 1).

In the motion compensation method, a motion vector of an image is detected on a pixel basis or on a block basis between the field 1a' and the field 1b', which is one frame later, of the double-speed video signal S3 shown in FIG. 11(A) with, for example, a block matching method. The detected motion vector is taken as A.

Then, as shown in FIG. 11(B), the pixel of the field 1a' from which the movement of the block is detected is shifted by A×½. Similarly, a motion vector B of the image between the field 1b' and the field 2a', which is one frame later, is detected, and the pixel of the field 1b' from which the movement of the block is shifted by B×½. By shifting the image with motion vectors detected as described above, the image can be moved smoothly between fields as shown in FIG. 11(C).

In a case where the double-speed video signal S3 is a film material created with the telecine conversion, a motion vector of the image in the double-speed video signal S3 shown in FIG. 12(A) is detected on a block basis between the field 1a and the field 2a that is two frames later, with the block matching method. The detected motion vector is taken as A.

Then as shown in FIG. 12(B), the pixels of the fields 1a', 1b, and 1b' from which the movement of the block is detected are shifted by A×¼, A×2/4, and A×¾, respectively. By shifting the image with motion vectors detected in this way, the image can be moved smoothly between fields as shown in FIG. 12(C).

Patent Reference JP-A-H10-501953

Actually, in many cases, a luminance level and color vary as an image moves. In such cases, the above-described motion compensation method causes a little unnaturalness in a compensated image. This is a problem.

Further, motion vectors which are detected with the above-described block matching method are not always appropriate and motion vectors that are greatly different from actual movement of an image may be detected. For example, such erroneous detection of motion vectors is easily caused in a case where two movements exists in a block, such as a case where background and foreground moves in different directions, where an image is turning, or where an image is zoomed or deformed.

Since the above-described motion compensation method performs motion compensation by ¾, at maximum, of a motion vector (fields 1b' and 2b' of FIG. 12), the unnaturalness of a compensated image becomes remarkable when a motion vector is detected erroneously. This is also a problem.

Further, as shown in FIG. 13, in a case where such a dynamic movement as to exceed a search range of the block matching method exists in an image, a correct motion vector cannot be obtained, which causes unnaturalness in a compensated image. This is also a problem.

DISCLOSURE OF THE INVENTION

This invention has been made in view of foregoing and proposes a motion compensation device capable of more appropriately performing motion compensation on a video signal subjected to double-speed conversion.

To solve the above problems, this invention provides a motion compensation device with: a motion vector detection means for detecting a motion vector between a detection pixel of a current field and a detection pixel of a reference field, from the image information of the current field and the image information of the reference field that is one frame later than the current field, in a video signal created by performing double-speed conversion on a video signal; an image shifting means for shifting the detection pixel of the current field by ½ of the motion vector and shifting the detection pixel of the reference field by −½ of the motion vector; and an averaging means for performing motion compensation on the video signal of the current field by weighting and combining the pixel data of the detection pixel of the current field and the pixel data of the detection pixel of the reference field shifted by the image shifting means.

Further, a motion compensation device is provided with: a motion vector detection means for detecting a motion vector between a detection pixel of a current field and a detection pixel of a reference field, from the image information of the current field in a video signal and the image information of the reference field in a reference video signal obtained by delaying the video signal by two frames, the video signal created by performing telecine conversion and then double-speed conversion on a film; an image shifting means for shifting the detection pixels of three fields following the current field in the video signal by ¼, 2/4, and ¾ of the motion vector, respectively, and shifting detection pixels of three fields following the reference field in the reference video signal by −¾, −2/4, and −¼ of the motion vector, respectively; and an averaging means for performing motion compensation on the video signal of the three fields following the current field by weighting and combining the pixel data of the detection pixels of the three fields following the current field and the pixel data of the detection pixels of the three fields following the reference field shifted by the image shifting means.

As a result, the movement of a double-speed video signal between fields can be compensated so as to be smoother than conventional cases.

In addition, the averaging means performs weighted average on each detection pixel, the weighted average being inversely proportional to a shift amount by the image shifting means.

By performing the weighted average inversely proportional to the shift amount of a pixel, the movement of an image between fields can be compensated so as to be much smoother.

Furthermore, according to this invention, a motion compensation device for performing motion compensation on N-time-speed video signal subjected to N-time-speed conversion by inserting N−1 pieces of interpolation screens created from an original screen of a video signal between the original screen and the next original screen is provided with: a motion vector detection means for detecting a motion vector between a detection pixel of the original screen and a detection pixel of a reference screen, from the image information of the original screen and the image information of the reference screen that is an original screen next to the original screen; an image shifting means for shifting a detection pixel of an m-th interpolation screen ($1 \leq m \leq N-1$) corresponding to the detection pixel of the original screen by m/N of the motion vector and shifting a detection pixel of an m+N-th interpolation screen corresponding to the detection pixel of the reference screen by $-(N-m)/N$ of the motion vector; and a compensation means for outputting, as an m-th motion-compensated interpolation screen, the result of weighting each of the pixel data of the detection pixel of the m-th interpolation screen and the pixel data of the detection pixel of the m+N-th interpolation screen shifted by the image shifting means, by a value inversely proportional to the shift amount by the image shifting means and combining the weighting results.

A motion compensation device for compensating the movement of an image signal of new N−1 pieces of interpolation screens inserted between an original screen of a video signal and a next original screen is provided with: a motion vector detection means for detecting a motion vector between a detection pixel of the original screen and a detection pixel of a reference screen, from the image information of the original screen and the image information of the reference screen that is an original screen next to the original screen; an image shifting means for shifting the position of the pixel data corresponding to the detection pixel of the original screen by m/N of the motion vector and shifting the position of the pixel data corresponding to the detection pixel of the reference screen by −(N−m)/N of the motion vector when an m-th (1≦m≦N−1) interpolation screen is compensated; and a compensation means for compensating the image signal of the interpolation screens by weighting and combining the pixel data corresponding to the detection pixel of the original screen and the pixel data corresponding to the detection pixel of the reference screen shifted by the image shifting means.

As a result, the movement of an image between fields in an N-time-speed video signal subjected to N-time-speed conversion can be compensated so as to be smoother.

BEST MODE FOR CARRYING OUT THE INVENTION

Hereinafter, one embodiment of this invention will be described with reference to the accompanying drawings.

Figure 1:
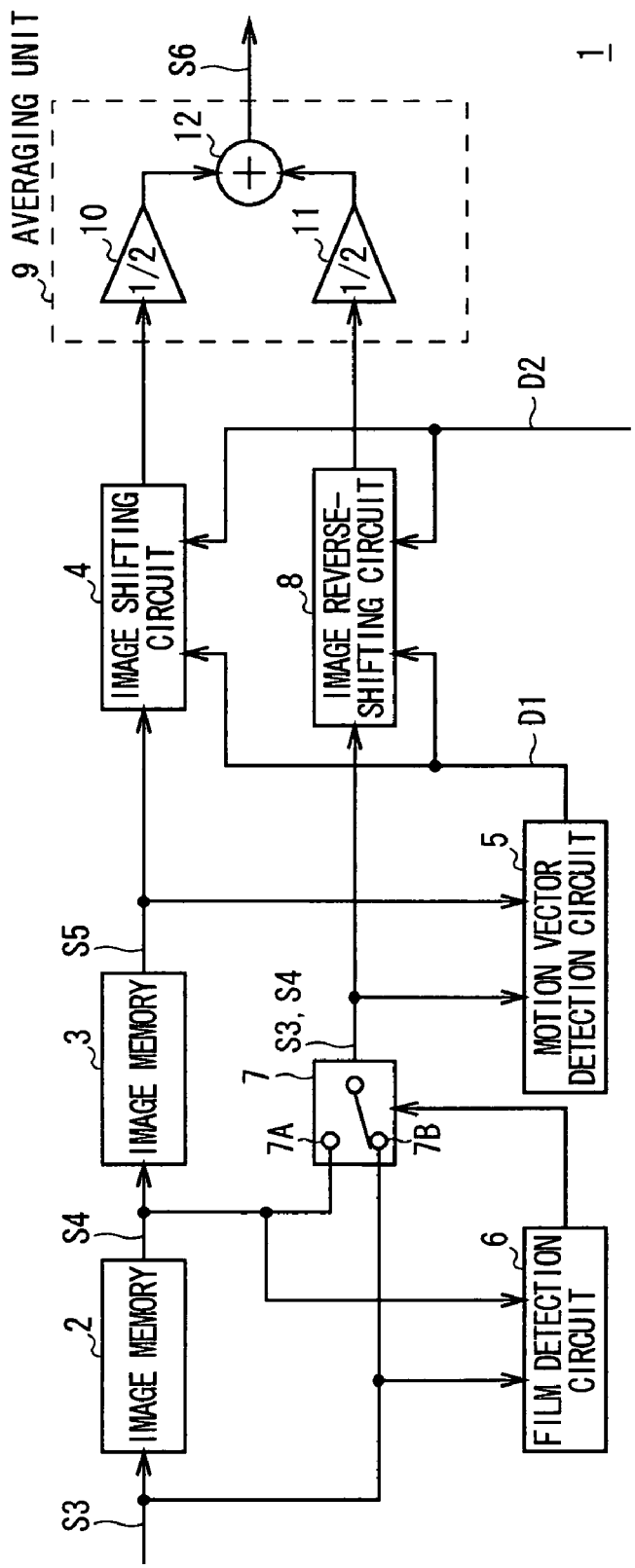
FIG. 1 is a block diagram showing the construction of a compensation device according to this invention.

Referring to FIG. 1, reference numeral 1 shows a motion compensation device according to this invention. A field doubling conversion circuit (not shown) of a former stage inputs a double-speed video signal S3 of 100 fields per second created by performing double-speed conversion on a PAL signal of 50 fields per second, to an image memory 2.

The image memory 2 delays the double-speed video signal S3 by one frame to create a one-frame-delayed double-speed video signal S4 and inputs this to an image memory 3 of the later stage. The image memory 3 further delays the one-frame-delayed double-speed video signal S4 by one frame to create a two-frame-delayed double-speed video signal S5 and inputs this to an image shifting circuit 4 and a motion vector detection circuit 5.

On the other hand, a film detection circuit 6 determines based on a correlation between the double-speed video signal S3 and the one-frame-delayed double-speed video signal S4 whether the input double-speed video signal S3 is a film material. That is, when the input double-speed video signal S3 is a film material, four fields (two frames) created from the same frame continue in the double-speed video signal S3. Therefore, a periodical correlation can be detected between the double-speed video signal S3 and the one-frame-delayed double-speed video signal S4 that is one frame before.

The film detection circuit 6 calculates each differential value of the signal levels of corresponding-pixels of the double-speed video signal S3 and the one-frame-delayed double-speed video signal S4. When the differential values are alternatively a prescribed value or higher/a prescribed value or lower every frame, the correlation between the double-speed video signal S3 and the one-frame-delayed double-speed video signal S4 is high and the double-speed video signal S3 is determined as a film material. Then the film detection circuit 6 controls a select switch 7 according to this determination result.

That is, when it is determined that the double-speed video signal S3 is not a film material, the film detection circuit 6 switches the select switch 7 to a terminal 7A side, so as to input the one-frame-delayed double-speed video signal S4 as a reference video signal to an image reverse-shifting circuit 8 and the motion vector detection circuit 5.

The motion vector detection circuit 5 sequentially detects motion vectors between one-frame-separated frames of an image on a pixel basis or on a block basis, between the fields of the two-frame-delayed double-speed video signal S5 as the current fields and the fields of the one-frame-delayed double-speed video signal S4 as the reference fields. At this time, the motion vector detection circuit 5 searches each pixel or each block to find where a target pixel (this pixel is referred to as detection pixel) of a current field is in the reference field, and detects a motion vector from the detection pixel of the current field to the detection pixel of the reference field.

Figure 2:
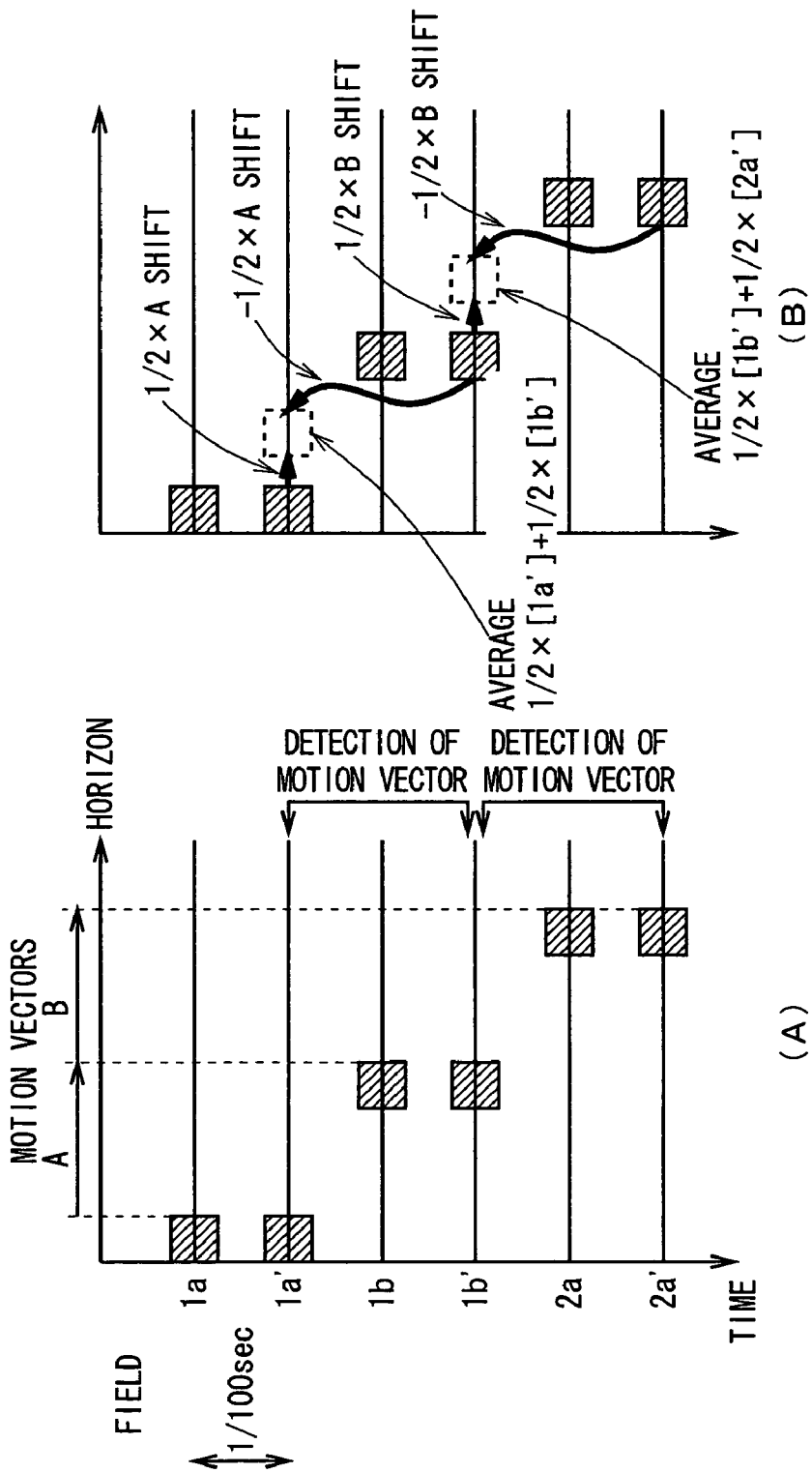
FIG. 2 is a schematic diagram showing improvement of movement when a double-speed video signal is not a film material.

That is, as shown in FIG. 2(A), a motion vector between the field 1a' (two-frame-delayed double-speed video signal S5) as a current field and the field 1b' (one-frame-delayed double-speed video signal S4) as a reference field that is one frame later is A, and a motion vector between the field 1b' as a current field and the field 2a' as a reference field that is one frame later is B. The motion vector detection circuit 5 gives motion vectors detected as described above between frames on a pixel basis or on a block basis, to the image shifting circuit 4 and the image reverse-shifting circuit 8 as motion vector information D1. In addition, the image shifting circuit 4 and the image reverse-shifting circuit 8 receive a compensation timing control signal D2 for every field from a field detection circuit not shown.

The image shifting circuit 4 and the image reverse-shifting circuit 8 serving as image shifting means shift each pixel of the two-frame-delayed double-speed video signal S5 and the one-frame-delayed double-speed video signal S4 as a reference video signal, according to a corresponding detected motion vector, based on the motion vector information D1 and the compensation timing control signal D2.

That is, as shown in FIG. 2(B), the image shifting circuit 4 shifts each pixel of the field 1a' of the two-frame-delayed double-speed video signal S5 as the current field by ½×A and gives the resultant to the averaging unit 9 of the later stage. In addition, the image reverse-shifting circuit 8 shifts each pixel of the field 1b' of the one-frame-delayed double-speed video signal S4 as the reference field by −½×A and gives the resultant to the averaging unit 9. Similarly, the image shifting circuit 4 shifts each pixel of the field 1b' of the two-frame-delayed double-speed video signal S5 as the current field by ½×B and gives the resultant to the averaging unit 9. In addition, the image reverse-shifting circuit 8 shifts each pixel of the field 2a' of the one-frame-delayed double-speed video signal S4 as the reference field by −½×B and gives the resultant to the averaging unit 9. This shifting of each pixel is performed by controlling timing to output each piece of pixel data from the image shifting circuit 4 and the image reverse-shifting circuit 8 to the averaging unit 9.

In this way, the image shifting circuit 4 and the image reverse-shifting circuit 8 sequentially shifts the pixels of the two-frame-delayed double-speed video signal S5 and the one-frame-delayed double-speed video signal S4 according to the motion vector information D1, and gives the resultants to the averaging unit 9.

A first weighting unit 10 of the averaging unit 9 weights the pixel data of each pixel of the field 1a' of the two-frame-delayed double-speed video signal S5 by ½ as shown in FIG. 2(B) and gives the resultant to a signal combination unit 12. A second weighting unit 11 weights the signal level of each pixel of the field 1b' of the one-frame-delayed double-speed video signal S4 by ½ and gives the resultant to the signal combination unit 12. Similarly, the first weighting unit 10 weights the pixel data of each pixel of the field 1b' of the two-frame-delayed double-speed video signal S5 by ½ and gives the resultant to the signal combination unit 12. The second weighting unit 11 weights the pixel data of each pixel of the field 2a' of the one-frame-delayed double-speed video signal S4 by ½ and gives the resultant to the signal combination unit 12.

In this way, the first weighting unit 10 and the second weighting unit 11 weight the signal level of each pixel of the two-frame-delayed double-speed video signal S5 as the current field and the one-frame-delayed double-speed video signal S4 as the reference field, by ½, and give the resultant to the signal combination unit 12.

The signal combination unit 12 combines the two-frame-delayed double-speed video signal S5 and the one-frame-delayed double-speed video signal S4 and outputs the created compensated double-speed video signal S6 to a CRT 104 not shown.

The signal combination unit 12 outputs an image obtained by averaging and combining the shifted field 1a' and one field 1b', as a motion-compensated new field 1a'. Similarly, this unit 12 outputs an image obtained by averaging and combining the shifted field 1b' and field 2a', as a motion-compensated new field 1b'.

When it is determined that the double-speed video signal S3 is a film material, on the other hand, the film detection circuit 6 switches the select switch 7 to a terminal 7B side, to input the double-speed video signal S3 as a reference video signal to the image reverse-shifting circuit 8 and the motion vector detection circuit 5.

Figure 3:
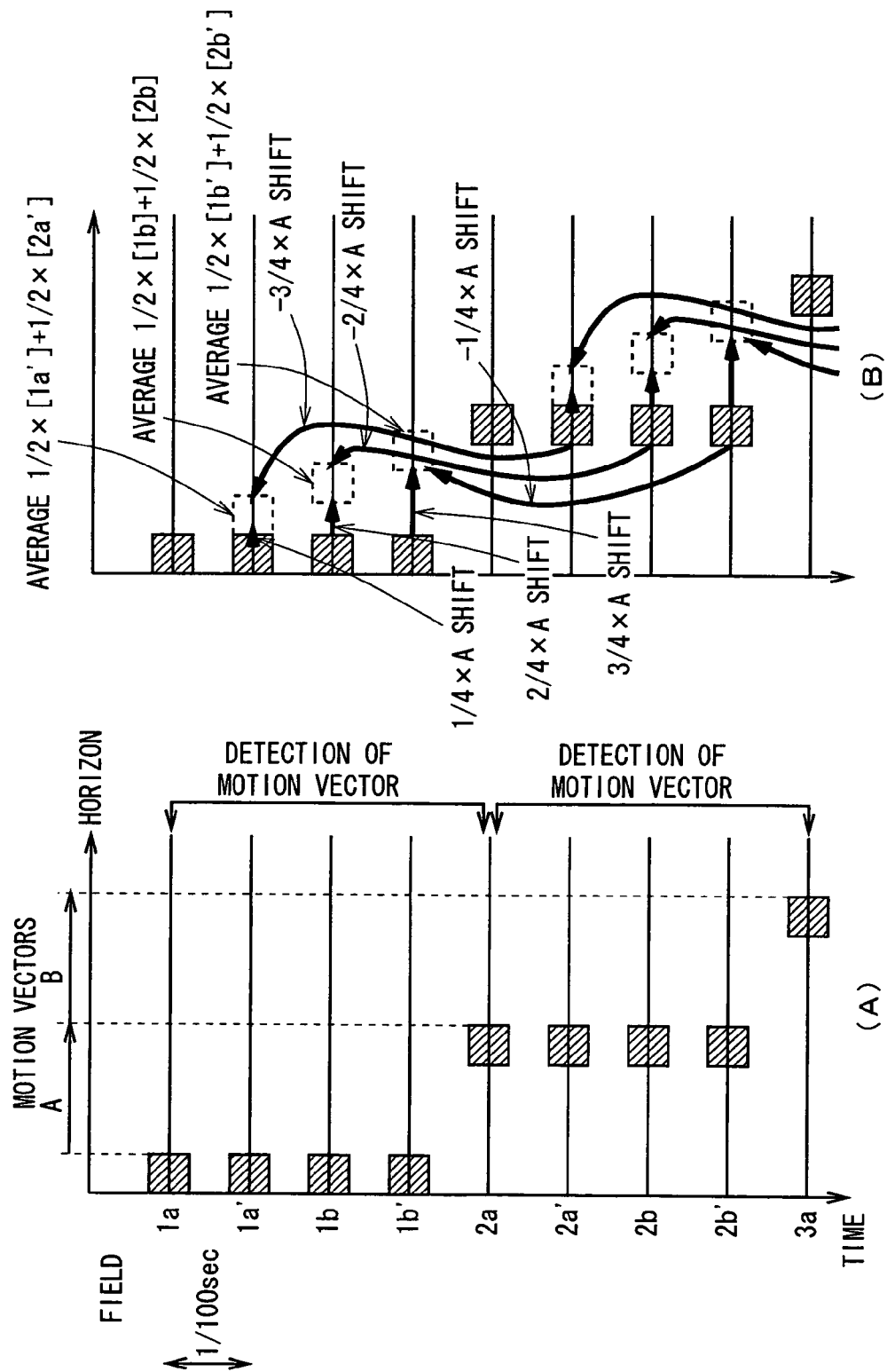
FIG. 3 is a schematic diagram showing improvement of movement when a double-speed video signal is a film material.

The motion vector detection circuit 5 sequentially detects motion vectors between two-frame-separated frames of an image on a pixel basis or on a block basis, between fields of the two-frame-delayed double-speed video signal S5 as the current fields and the double-speed video signal S3 as the reference fields. That is, as shown in FIG. 3(A), a motion vector between the field 1a (two-frame-delayed double-speed video signal S5) as a current field and the field 2a (double-speed video signal S3) as a reference field that is two frames later is A, and a motion vector between the field 2a as a current field and the field 3a as a reference field that is two frames later is B. The motion vector detection circuit 5 gives motion vectors detected as described above between frames on a pixel basis or on a block basis, to the image shifting circuit 4 and the image reverse-shifting circuit 8 as motion vector information D1. In addition, the image shifting circuit 4 and the image reverse-shifting circuit 8 receive a compensation timing control signal D2 for every field, from a field detection circuit not shown.

The image shifting circuit 4 and the image reverse-shifting circuit 8 shift the pixels of the two-frame-delayed double-speed video signal S5 and the double-speed video signal S3 based on the detected motion vectors according to the motion vector information D1 and the compensation timing control signal D2.

That is, as shown in FIG. 3(B), the image shifting circuit 4 shifts the fields 1a', 1b, and 1b' of the two-frame-delayed double-speed video signal S5 as the current fields by ¼×A, 2/4×A, and ¾×A, respectively, and gives the resultants to the averaging unit 9 of the later stage. In addition, the image reverse-shifting circuit 8 shifts the fields 2a', 2b and 2b' of the double-speed video signal S3 as the reference fields by −¾×A, −2/4×A, and −¼×A, respectively, and gives the resultants to the averaging unit 9 of the later stage.

In this way, the image shifting circuit 4 and the image reverse-shifting circuit 8 sequentially shift the pixels of the two-frame-delayed double-speed video signal S5 as the current fields and the double-speed video signal SS3 as the reference fields according to the motion vector information D1 with time, and gives the resultants to the averaging unit 9.

As shown in FIG. 3(B), the first weighting unit 10 of the averaging unit 9 weights the pixel data of each pixel of the fields 1a', 1b, and 1b' of the two-frame-delayed double-speed video signal S5 by ½ and gives the resultant to the signal combination unit 12. The second weighting unit 11 weights the pixel data of each pixel of the fields 2a', 2b, and 2b' of the double-speed signal S3 by ½ and gives the resultant to the signal combination unit 12.

In this way, the first weighting unit 10 and the second weighting unit 11 weight the pixel data of the pixels of the two-frame-delayed double-speed video signal S5 and the double-speed video signal S3 by ½ and gives the resultants to the signal combination unit 12.

The signal combination unit 12 combines the two-frame-delayed double-speed video signal S5 and the double-speed video signal S3 and outputs the created compensated double-speed video signal S6 to the CRT 104 not shown.

That is, as shown in FIG. 3(B), by combining the weighted two-frame-delayed double-speed video signal S5 and double-speed video signal S3, the signal combination unit 12 takes an image obtained by averaging and combining the shifted field 1a' and field 2a', as a motion-compensated new field 1a', takes an image obtained by averaging and combining the shifted field 1b and field 2b, as a motion-compensated new field 1b, and takes an image obtained by averaging and combining the shifted field 1b' and field 2b', as a motion-compensated new field 1b'.

As described above, the motion compensation device 1 shifts the current fields and the reference fields which are one frame or two frames later, in opposite directions, with motion vectors between frames detected by the motion vector detection circuit 5, and then combines and averages the resultants, thereby compensating the movement of the image between continuous fields so as to be smoother.

In the above technique, the film detection circuit 6 of the motion compensation device 1 determines whether the input double-speed video signal S3 is a film material.

When the double-speed video signal S3 is not a film material, the motion vector detection circuit 5 detects motion vectors between one-frame-separated frames of an image, between the two-frame-delayed video signal S5 obtained by delaying the double-speed video signal S3 by two frames and the one-frame-delayed video signal S4 obtained by delaying the double-sped video signal S3 by one frame.

Then the motion compensation device 1 shifts each pixel of the two-frame-delayed double-speed video signal S5 by ½ of the detected motion vector, and shifts each pixel of the one-frame-delayed double-speed video signal S4 by −½ of the detected motion vector, and then averages and combines the resultants to create the compensated double-speed video signal S6.

When the double-speed video signal S3 is a film material, the motion vector detection circuit 5 detects motion vectors between two-frame-separated frames of an image, between the two-frame-delayed double-speed video signal S5 obtained by delaying the double-speed video signal S3 by two frames and the double-speed video signal S3.

Then the motion compensation device 1 shifts the pixels of each field of the two-frame-delayed double-speed video signal S5 by ¼, 2/4, and ¾ of the detected motion vector with time, and shifts the pixels of each field of the double-speed video signal S3 by −¾, −2/4, and −¼ of the detected motion vector with time, and then averages and combines the resultants to create the compensated double-speed video signal S6.

In this way, the image of a current field and the image of a reference field that is one frame or two frames later are shifted in opposite directions based on a detected motion vector between frames, and the resultant of combining and averaging these is treated as an image of the compensated field, thereby being capable of compensating movement between fields so as to be much smoother than conventional cases.

Figure 4:
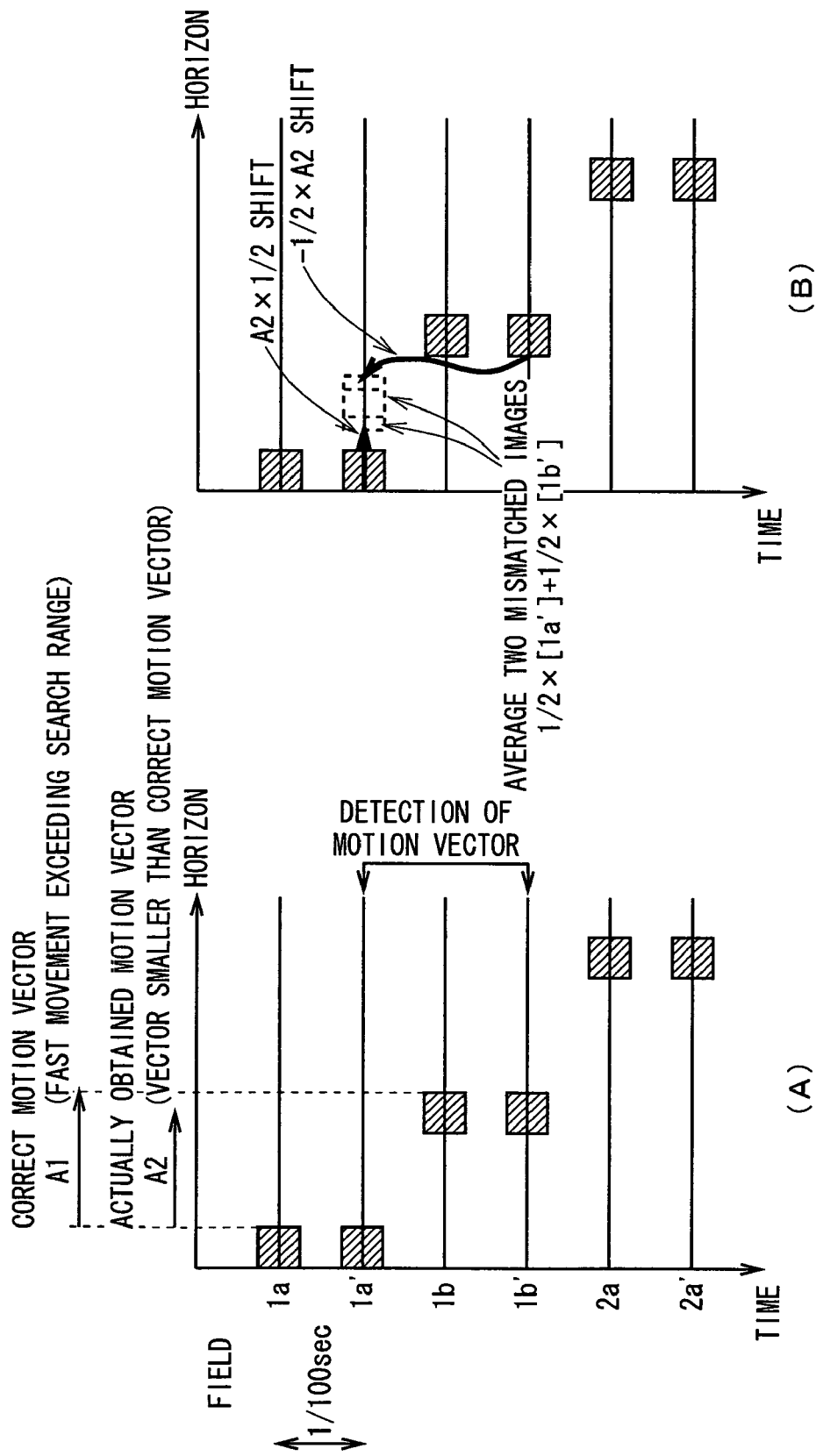
FIG. 4 is a schematic diagram showing a case where a motion vector exceeds a search range.

When an image has a dynamic movement exceeding a search range of the motion vector detection circuit 5, a motion vector A2 to be detected by the motion vector detection circuit 5 is smaller than an actual motion vector A1 of the image, as shown in FIG. 4(A).

If a current field and a reference field are shifted with thus detected small motion vector A2, a compensated field is displayed such that two mismatched images are superimposed at an almost center of the movement of the image between the fields, as shown in FIG. 4(B).

Therefore, according to this invention, even when an image has a dynamic movement exceeding the search range of the motion vector detection circuit 5, the movement between fields can be compensated so as to be much smoother than conventional cases.

Note that, in the above embodiment, the first weighting unit 10 of the averaging unit 9 always weights the signal level of each pixel of the two-frame-delayed double-speed video signal S5 by ½ and the second weighting unit 11 always weights the pixel data of each pixel of the one-frame-delayed double-speed video signal S4 or the double-speed video signal S3 by ½, and the pixel data of each pixel shifted are always averaged and combined simply. This invention, however, is not limited to this and weighting of pixel data can be changed according to the shift amount of each pixel.

Figure 5:
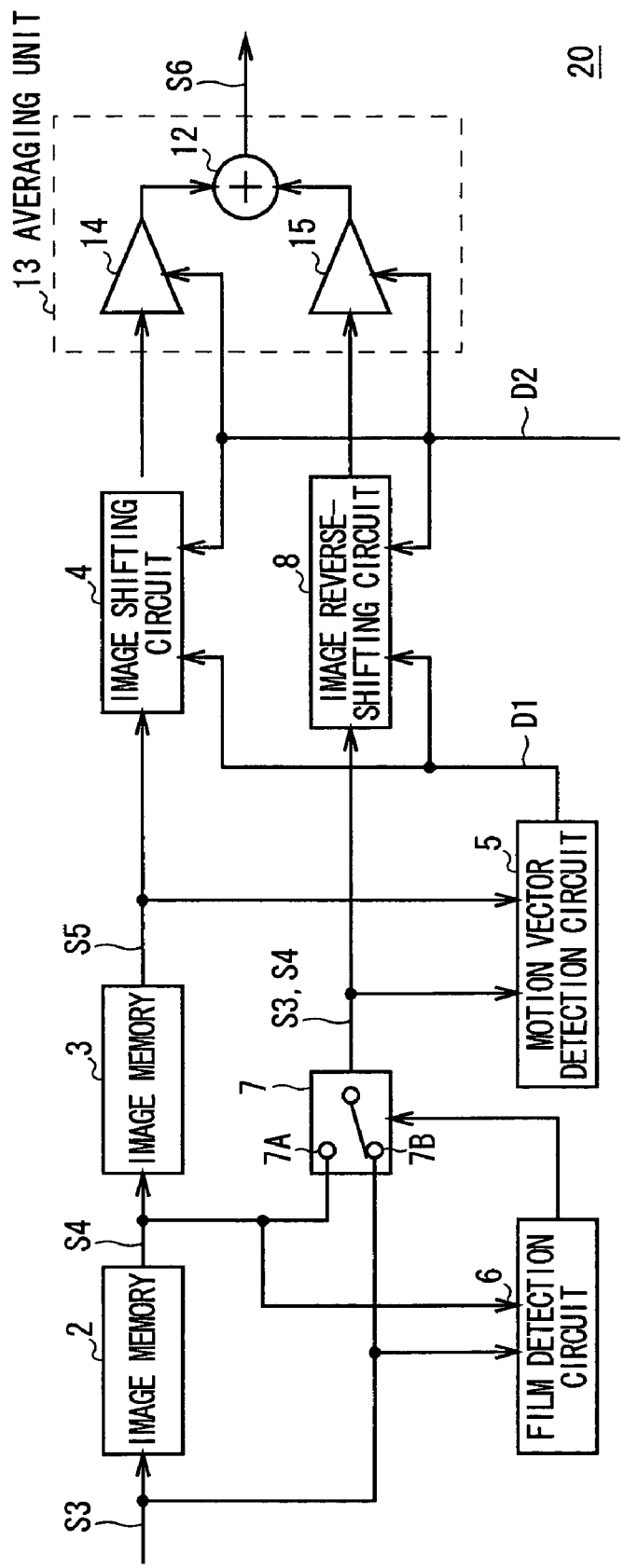
FIG. 5 is a block diagram showing the construction of a motion compensation device according to another embodiment.

That is, in FIG. 5 where the same reference numerals are applied to parts corresponding to those of FIG. 1, reference numeral 20 shows a motion compensation device of another embodiment of this invention, and is different from the motion compensation device 1 of FIG. 1 in a point where a first weighting unit 14 and a second weighting unit 15 of an averaging unit 13 perform weighting inversely proportional to the shift amount of each pixel on the pixel data of the pixel.

When a double-speed video signal S3 is not a film material, the shift amount of a pixel is always ½ and −½ of a detected motion vector. Therefore, the first weighting unit 10 and the second weighting unit 11 always perform the weighting by ½ and its explanation will be omitted.

Figure 6:
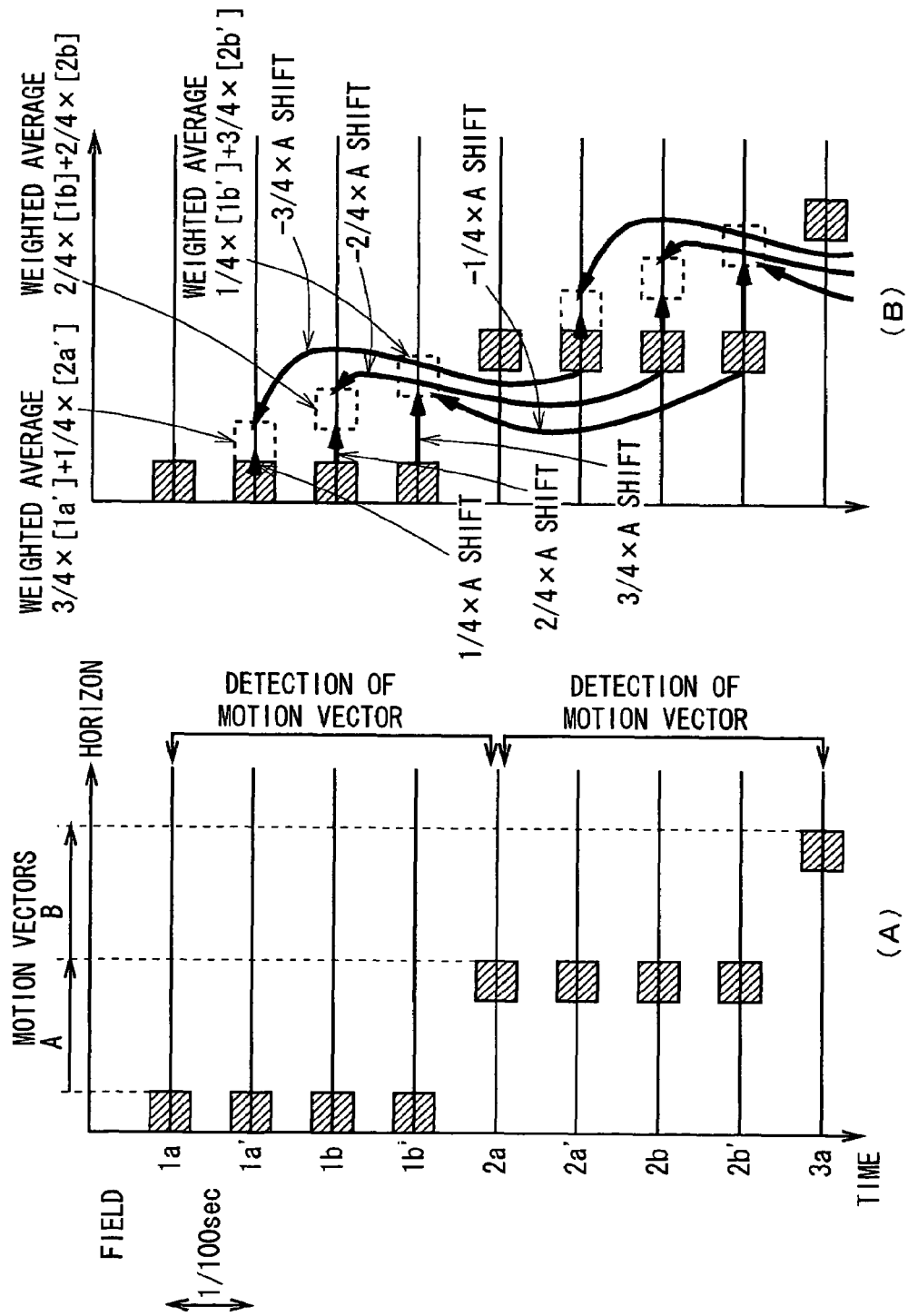
FIG. 6 is a schematic diagram showing improvement of movement when a double-speed video signal is a film material, according to another embodiment.
Figure 7:
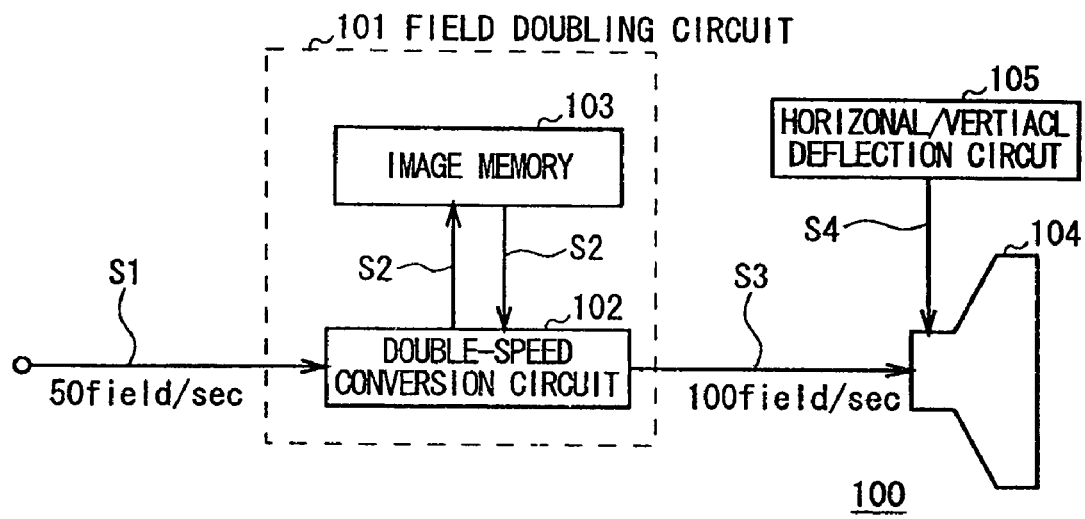
FIG. 7 is a block diagram showing the construction of a field doubling circuit.
Figure 8:
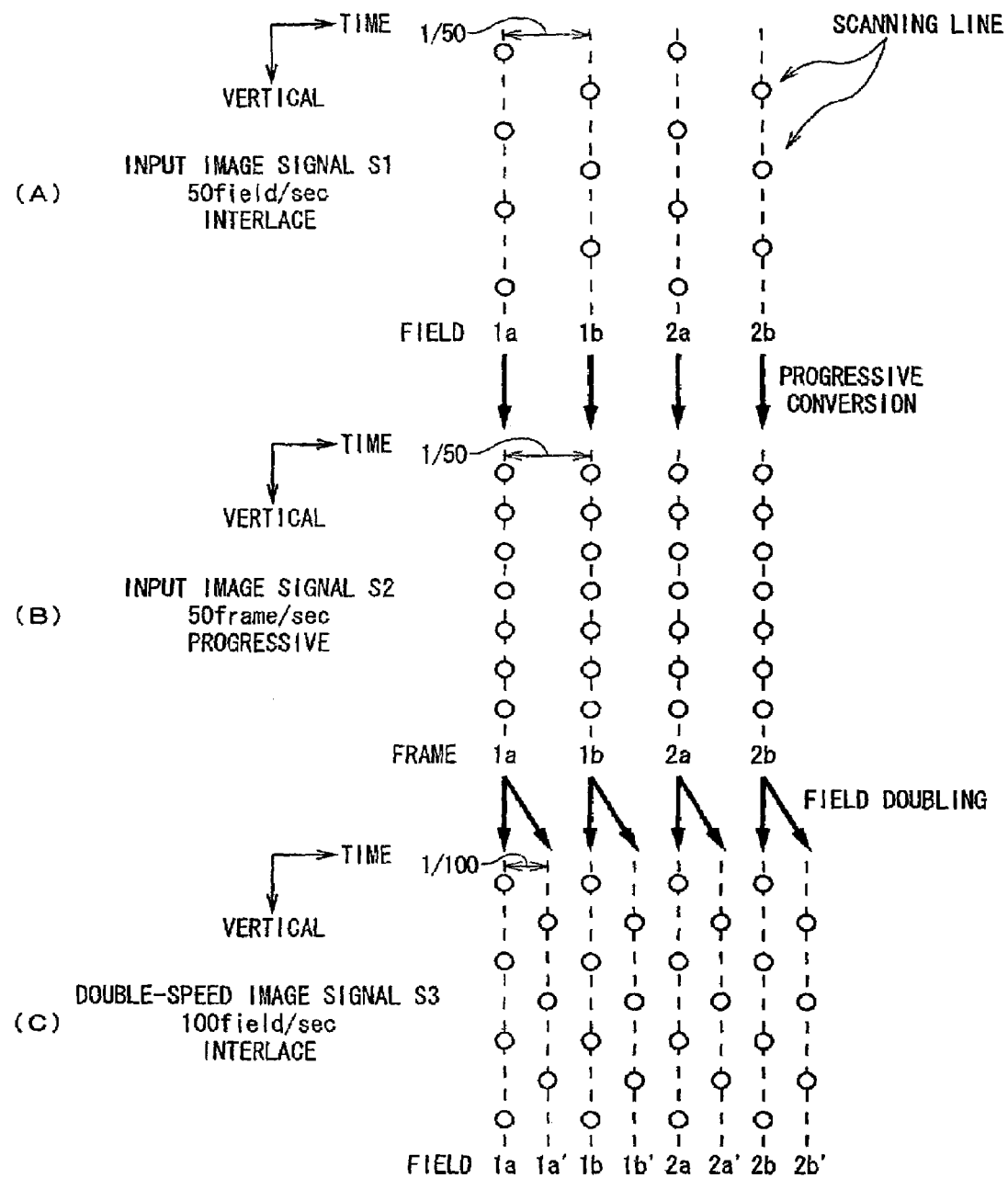
FIG. 8 is a schematic diagram explaining double-speeding of a video signal.
Figure 9:
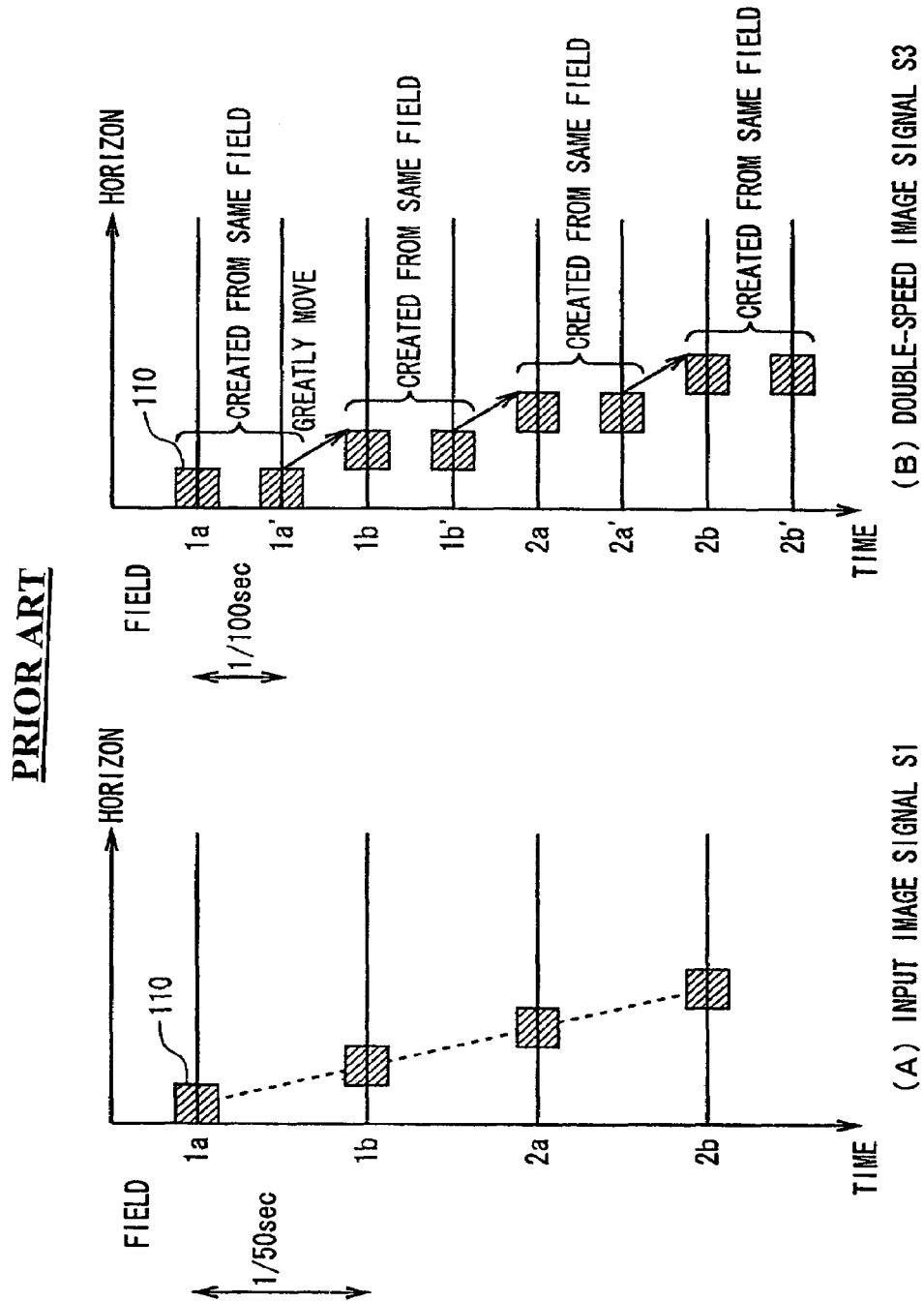
FIG. 9 is a schematic diagram explaining movement when a double-speed video signal is not a film material.
Figure 10:
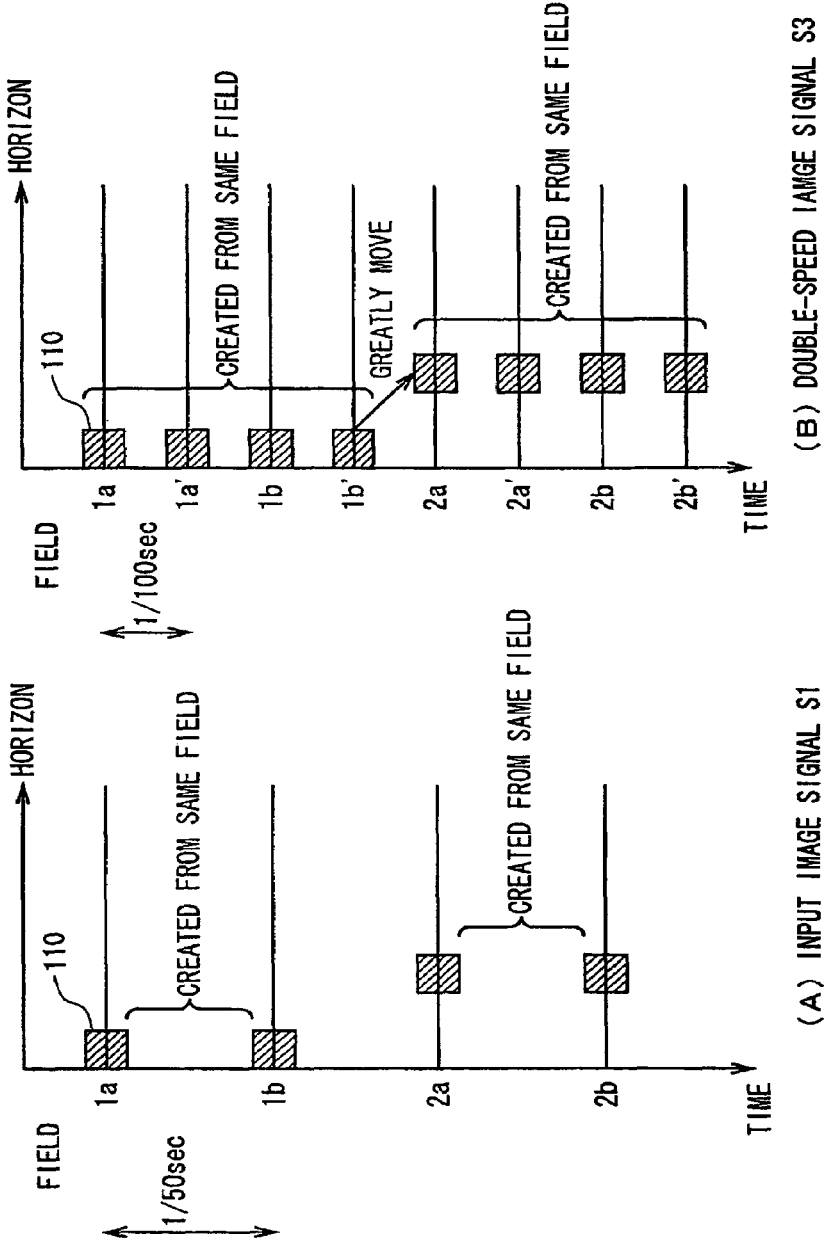
FIG. 10 is a schematic diagram explaining movement when a double-speed video signal is a film material.
Figure 11:
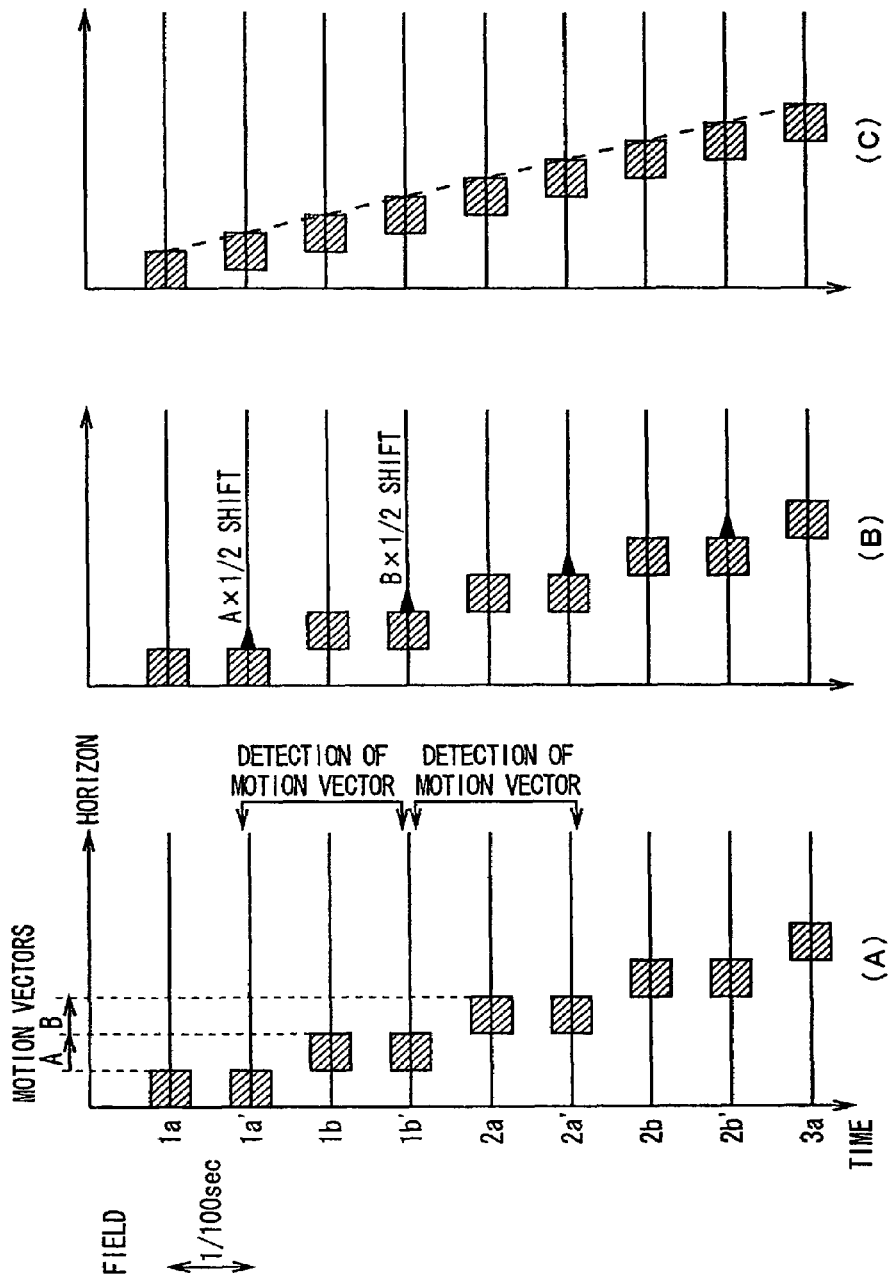
FIG. 11 is a schematic diagram showing improvement of movement when a double-speed video signal is not a film material.
Figure 12:
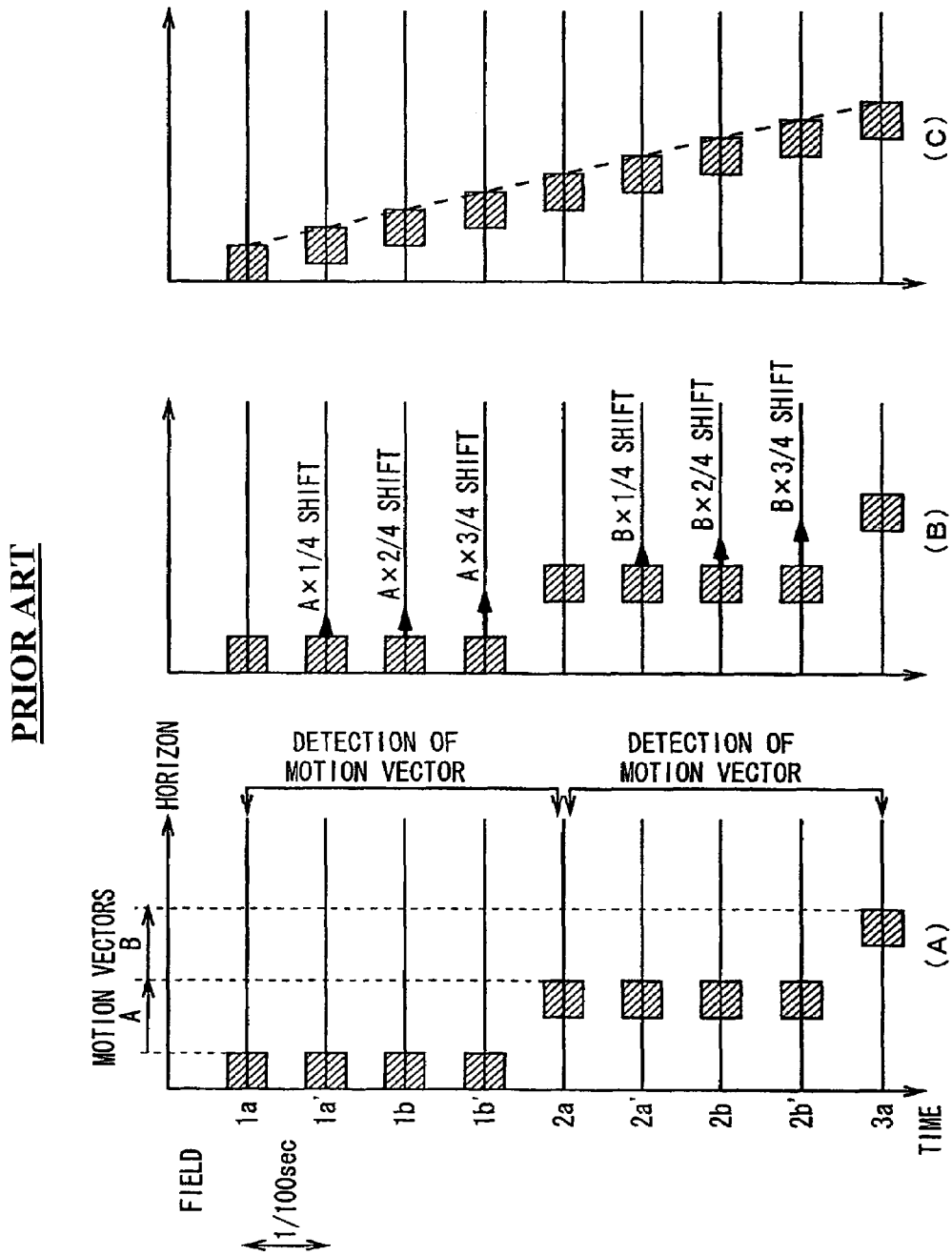
FIG. 12 is a schematic diagram showing improvement of movement when a double-speed video signal is a film material.
Figure 13:
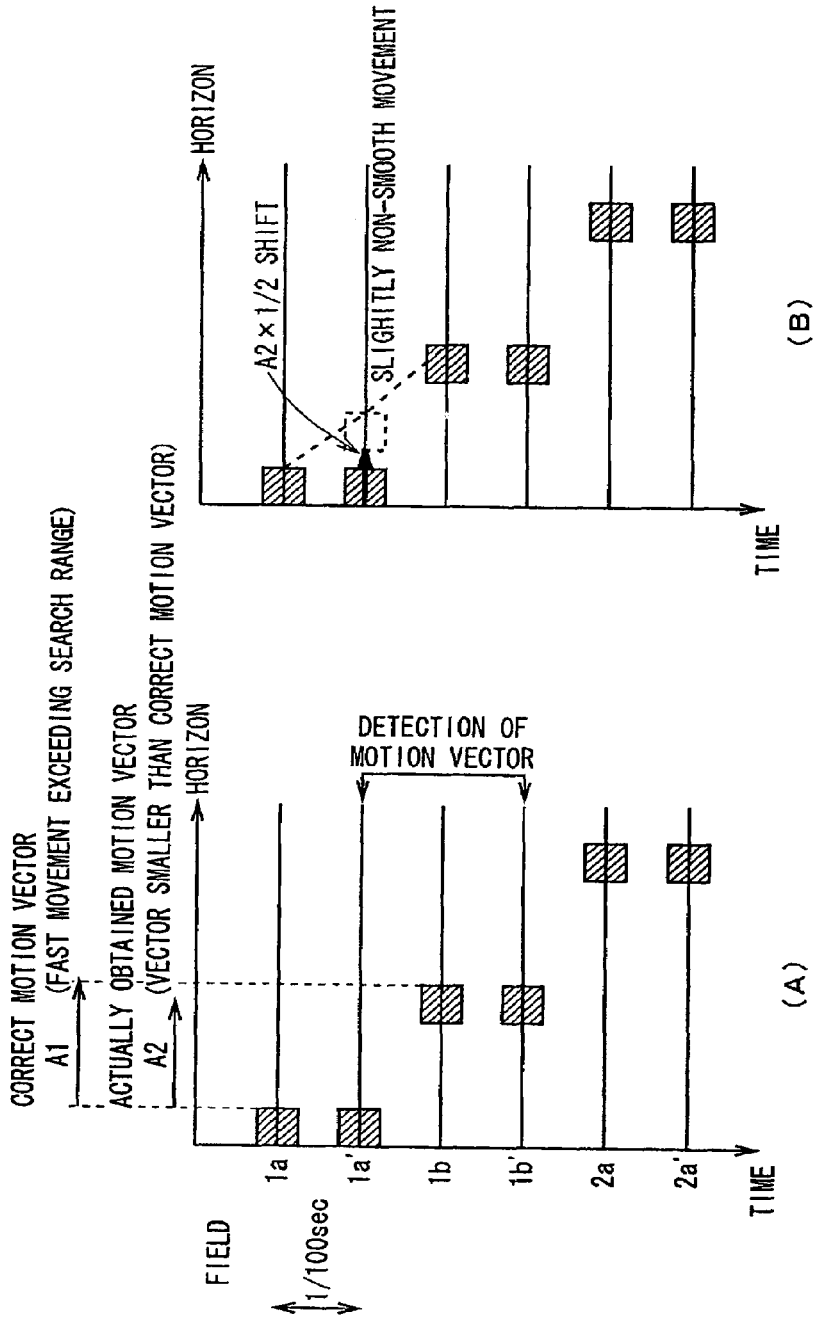
FIG. 13 is a schematic diagram showing a case where a motion vector exceeds a search range.

When the double-speed video signal S3 is a film material, the motion vector detection circuit 5 sequentially detects motion vectors between two-frame-separated frames of an image on a pixel basis or on a block basis, between the double-speed video signal S3 and the two-frame-delayed double-speed video signal S5. That is, as shown in FIG. 6(A), a motion vector between a field 1a (two-frame-delayed double-speed video signal S5) and a field 2a (double-speed video signal S3) that is two frames later is A and a motion vector between the field 2a and a field 3a which is two frames later is B. The motion vector detection circuit 5 gives the detected motion vectors between frames on a pixel basis or on a block basis, to an image shifting circuit 4 and an image reverse-shifting circuit 8 as motion vector information D1. In addition, the image shifting circuit 4 and the image reverse-shifting circuit 8 receive a compensation timing control signal for every field, from a field detection circuit not shown.

The image shifting circuit 4 and the image reverse-shifting circuit 8 serving as image shifting means shift each pixel of the two-frame-delayed double-speed video signal S5 and the double-speed video signal S3 based on the detected vector, according to the motion vector information D1 and the compensation timing control signal D2.

That is, as shown in FIG. 6(B), the image shifting circuit 4 shifts the fields 1a', 1b, and 1b' of the two-frame-delayed double-speed video signal S5 by ¼×A, 2/4×A, and ¾×A, respectively, and gives the resultants to the averaging unit 13. In addition, the image reverse-shifting circuit 8 shifts the fields 2a', 2b, and 2b' of the double-speed video signal S3 by −¾×A, −2/4×A, and −¼×A, respectively, and gives the resultants to the averaging unit 13.

In this way, the image shifting circuit 4 and the image reverse-shifting circuit 8 sequentially shift the pixels of the two-frame-delayed double-speed video signal S5 and the double-speed video signal S3 according to the motion vector information D1 with time, and gives the resultants to the averaging unit 13.

The first weighting unit 14 of the averaging unit 13 performs weighting inversely proportional to a shift amount, on the pixel data of each pixel of the fields 1a', 1b, and 1b' of the two-frame-delayed double-speed video signal S5, as shown in FIG. 6(B).

That is, the first weighting unit 14 weights by ¾ the field 1b' shifted by ¼×A, weights by 2/4 the field 1b shifted by 2/4×A, and weights by ¼ the field 1b' shifted by ¾×A, by ¼.

Similarly, the second weighting unit 15 performs the weighting inversely proportional to a shift amount, on the pixel data of each pixel of the fields 2a', 2b, and 2b' of the double-speed video signal S3.

That is, the second weighting unit 15 weights by ¼ the field 2a' shifted by −¾×A, weights by ⅔ the field 2b shifted by −²⁄₄×A, and weights by ¾ the field 2b' shifted by −¼×A.

Thus the first weighting unit 14 and the second weighting unit 15 perform the weighting inversely proportional to shift amounts of an image, on the pixel data of the pixels of the two-frame-delayed double-speed video signal S5 and the double-speed video signal S3, and gives the resultants to a signal combination unit 12.

The signal combination unit 12 combines the two-frame-delayed double-speed video signal S5 and the double-speed video signal S3 and outputs the created compensated double-speed video signal S6 to a CRT 104 not shown.

That is, as shown in FIG. 6(B), the signal combination unit 12 combines the weighted two-frame-delayed double-speed video signal S5 and double-speed video signal S3, thereby taking the average of the shifted field 1a' and field 2a' that is two frames later, as a motion-compensated new field 1a', taking the average of the shifted field 1b and field 2b that is two frames later, as a motion-compensated new field 1b, and taking the average of the shifted field 1b' and field 2b' that is two frames later, as a motion-compensated new field 1b'.

In this way, the motion compensation device 20 shifts a field to be compensated and a field that is two frames later, in opposite directions with a motion vector between frames detected by the motion vector detection circuit 5, then performs the weighted average inversely proportional to the shift amount, and combines the resultants, thereby being capable of compensating the movement of an image between continuous fields so as to be much smoother.

Even if an erroneous motion vector is detected due to the movement of an image exceeding the search range of the motion vector detection circuit 5, or even if a signal level varies as an image moves, the movement of an image between continuous fields can be compensated without causing unnaturalness.

Further, the above embodiment has described a case where the motion compensation is performed on a double-speed video signal of 100 fields per second obtained by performing the double-speed conversion on a PAL signal of 50 fields per second. This invention, however, is not limited to this and can be applied a case of performing the motion compensation on a double-speed video signal of 100 fields per second obtained by performing the double-speed conversion on an SECAM (Sequential a Memoire) signal of 50 fields per second, or on a double-speed video signal of 120 fields per second obtained by performing the double-speed conversion on an NTSC (National Television System Committee) signal of 60 fields per second. In addition, when the NTSC signal comprises computer graphics images of 30 frames per second, this invention can be applied to a case of performing the motion compensation on a double-speed video signal of 120 fields per second obtained by performing the double-speed conversion on the NTSC signal.

Furthermore, the above embodiment has described a case where the motion compensation is performed on a double-speed video signal. This invention, however, is not limited to this and can be widely applied to a case where the motion compensation is performed on an N-time-speed video signal subjected to N-time-speed conversion (N is a real number). Now, a case of performing the motion compensation on a quad-speed video signal will be described.

Figure 14:
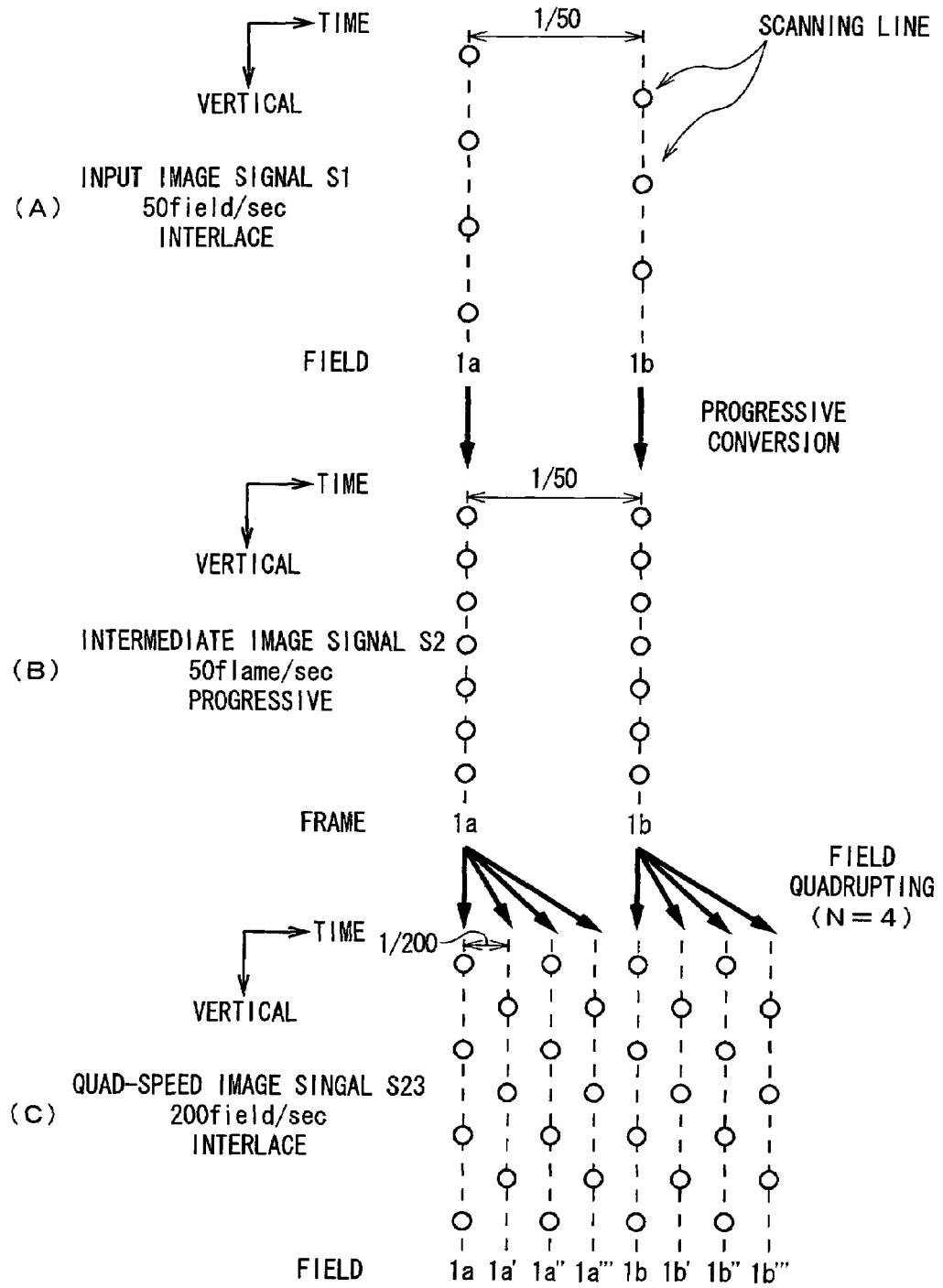
FIG. 14 is a schematic diagram explaining quad-speeding of a video signal.

First a quad-speeding process of a video signal will be described with reference to FIG. 14. The progressive conversion is performed on the number of scanning lines of a field 1a of an input video signal S1 shown in FIG. 14(A) to create a frame 1a shown in FIG. 14(B). Similarly, the progressive conversion is sequentially performed on fields 1b, . . . of the input video signal S1 to create frames 1b, . . . , thereby creating an intermediate video signal S2 of a progressive image of 50 frames per second.

Then the frame 1a shown in FIG. 14(B) is written in an image memory (not shown), and by reading this four times every other scanning line for every ¹⁄₂₀₀ second, four fields 1a, 1a', 1a" and 1a"' are created from the frame 1a. Similarly, four fields 1b, 1b', 1b", and 1b"' are created from the frame 1b of the intermediate video signal S2.

As a result, a quad-speed video signal S23 of an interlace image of 200 fields per second can be created. This technique is equivalent to a case of inserting N−1 pieces of interpolation images (fields 1a' to 1a"', 1b' to 1b"', . . . ) created from an original image between the original images (fields 1a, 1b, . . . ) of the input video signal S1.

Figure 15:
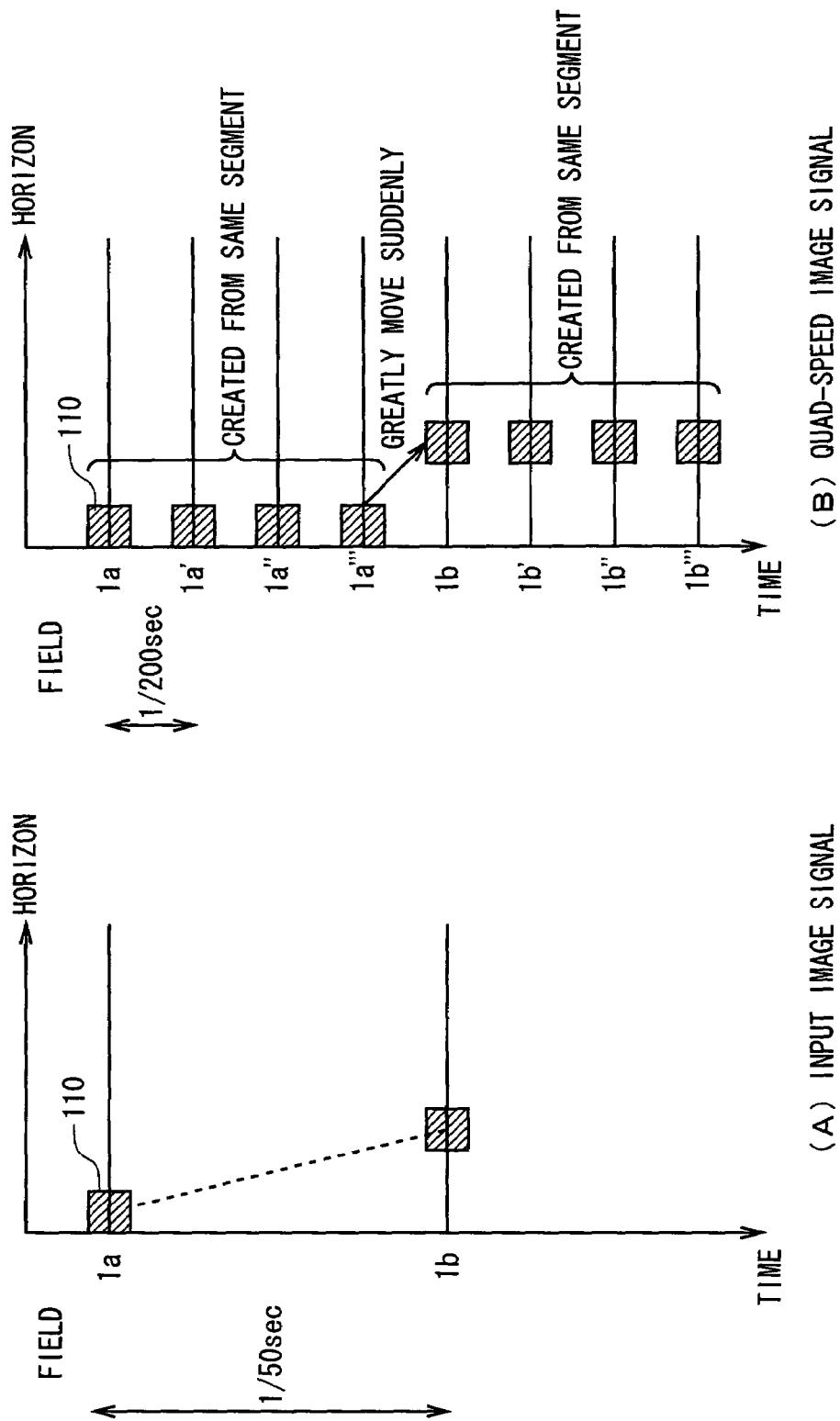
FIG. 15 is a schematic diagram explaining a quad-speed video signal.

The movement of the image of thus created quad-speed video signal S23 will be described with reference to FIG. 15. In an input video signal S1 shown in FIG. 15(A), an entity 110 moves to the right between four fields smoothly. In a quad-speed video signal S23 shown in FIG. 15(B), the entity 110 does not move because the fields 1a, 1a', 1a", and 1a"' are created from a same field. Then the entity 110 moves greatly from the field 1a' and the next field 1b because the field 1b is created from a different field.

Figure 16:
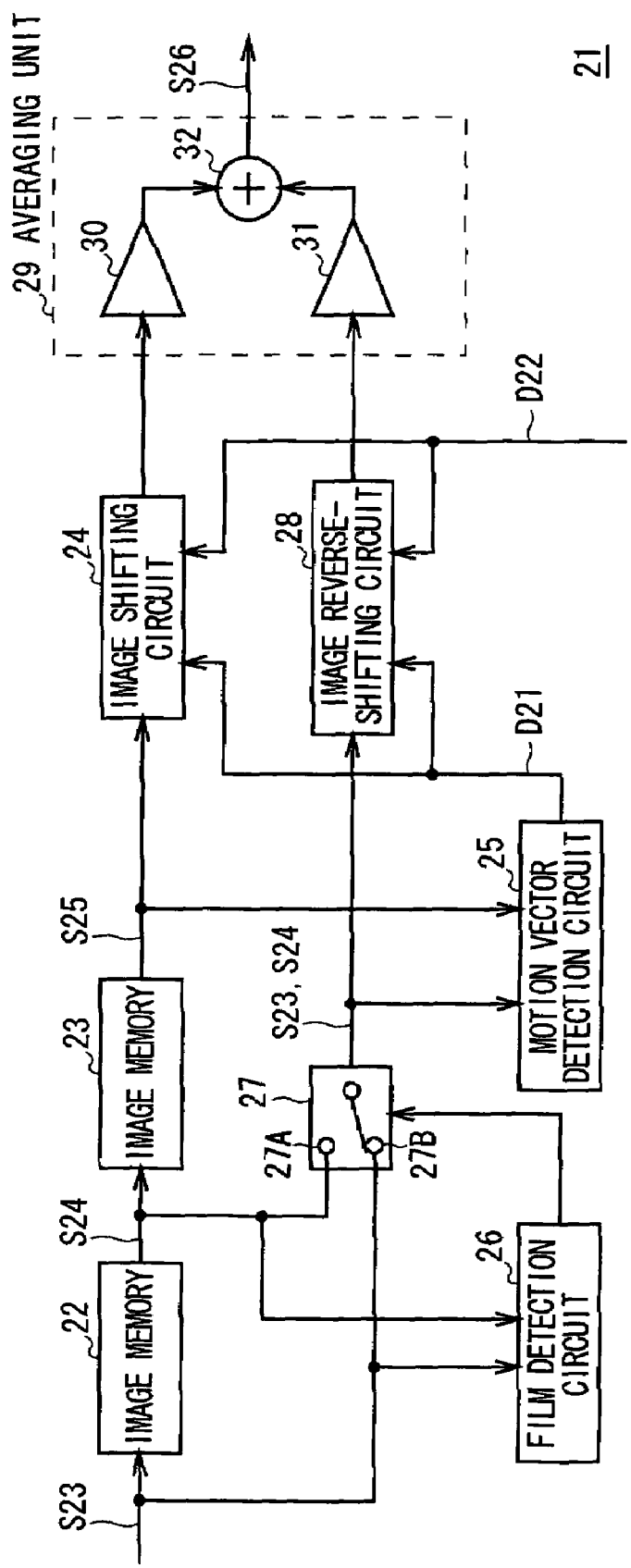
FIG. 16 is a block diagram showing the construction of a motion compensation device for a quad-speed video signal.

In FIG. 16, reference numeral 21 shows a motion compensation device for quad-speed video signals. A quad-speed video signal S23 of 200 fields per second obtained by performing quad-speed conversion on a PAL signal of 50 fields per second is input into an image memory 22.

The image memory 22 delays the quad-speed video signal S23 by two frames to create a two-frame-delayed quad-speed video signal S24 and input this to an image memory 23 of the later stage. The image memory 23 further delays the two-frame-delayed quad-speed video signal S24 by two frames to create a four-frame-delayed quad-speed video signal S25 and inputs this to an image shifting circuit 24 and a motion vector detection circuit 25.

A film detection circuit 26 determines based on a correlation between the quad-speed video signal S23 and the two-frame-delayed quad-speed video signal S24 whether the input quad-speed video signal S23 is a film material. When the input quad-speed video signal S23 is a film material, a periodical correlation can be detected between the quad-speed video signal S23 and the two-frame-delayed quad-speed video signal S24 that is two frames before, because the quad-speed video signal S23 has continuous 8 fields (four frames) created from a same segment.

The film detection circuit 26 calculates differential values of the signal levels of corresponding pixels of the quad-speed video signal S23 and the two-frame-delayed quad-speed video signal S24. When the differential values are a prescribed threshold value or higher/a prescribed threshold value or lower alternatively every two frames, the correlation between the quad-speed video signal S23 and the two-frame-delayed quad-speed video signal S24 is high and it is determined that the quad-speed video signal S23 is a film material. Then the film detection circuit 26 controls a select switch 27 according to this determination result.

That is, when it is determined that the quad-speed video signal 23 is not a film material, the film detection circuit 26 switches the select switch 27 to a terminal 27A side, to input the two-frame-delayed quad-speed video signal S24 as a reference video signal to an image reverse-shifting circuit 28 and a motion vector detection circuit 25.

The motion vector detection circuit 25 sequentially detects motion vectors between two-frame (four-field)-separated frames of an image on a pixel basis or on a block basis, between the fields of the four-frame-delayed quad-speed video signal S25 as current fields (current screen) and the fields of the two-frame-delayed quad-speed video signal S24 as reference fields (reference screen).

Figure 17:
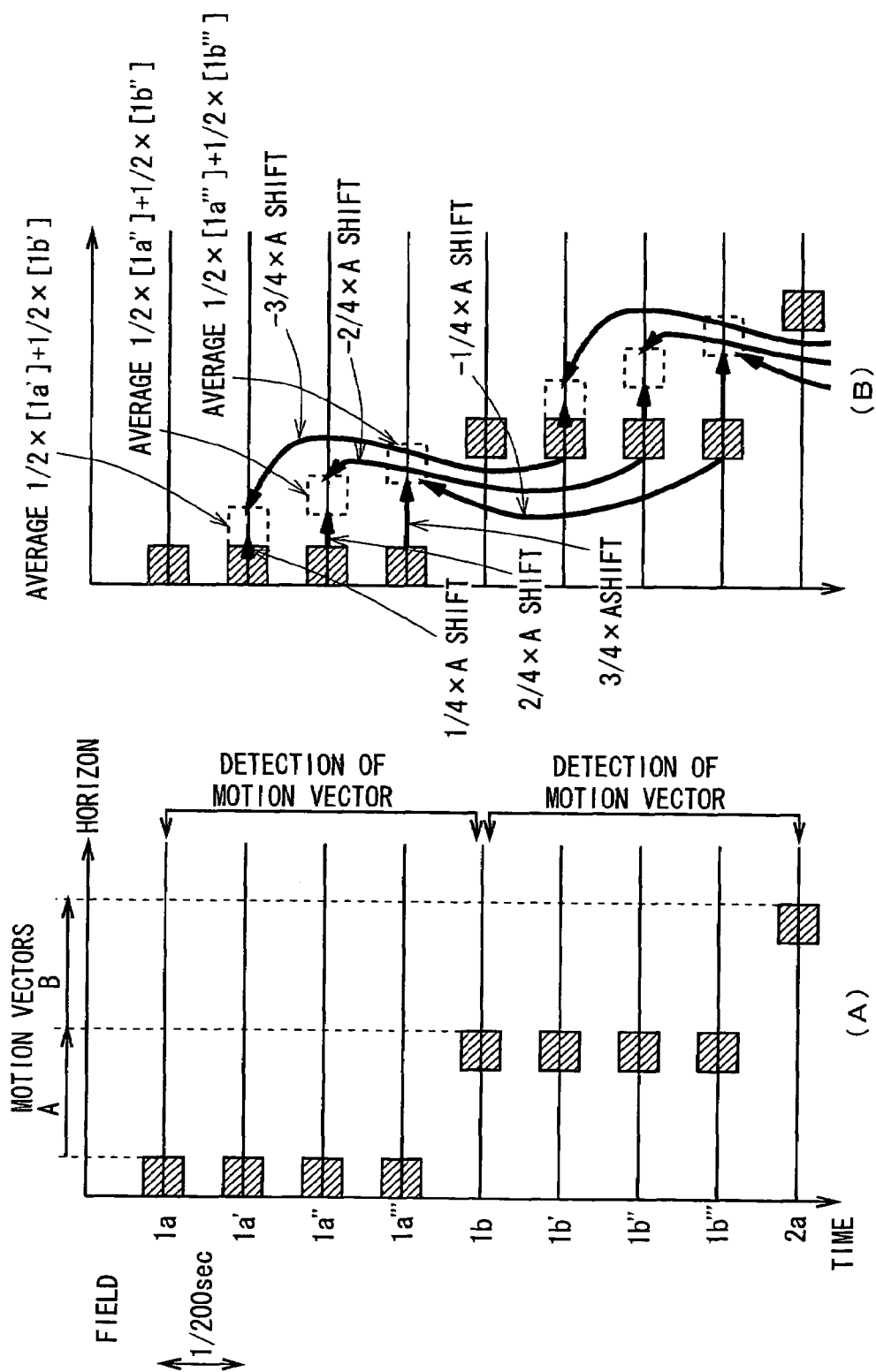
FIG. 17 is a schematic diagram showing improvement of movement of a quad-speed video signal.

That is, as shown in FIG. 17(A), a motion vector in a prescribed pixel or block between the field 1a (four-frame-delayed quad-speed video signal S25) as a current field and the field 1b (two-frame-delayed quad-speed video signal S24), that is two frames later, as a reference field is A, and a motion vector in a prescribed pixel or block between the field 1b as a current field and the field 2a, that is two frames later, as a reference field is B. The motion vector detection circuit 25 gives thus detected motion vectors between frames on a pixel basis or on a block basis, to the image shifting circuit 24 and the image reverse-shifting circuit 28 as motion vector information D21. In addition, the image shifting circuit 24 and the image reverse-shifting circuit 28 receive a compensation timing control signal D22 for every field, from a filed detection circuit not shown.

The image shifting circuit 24 and the image reverse-shifting circuit 28 as image shifting means shift each pixel of the four-frame-delayed quad-speed video signal S25 and the two-frame-delayed quad-speed video signal S24 as the reference signal from which the movement is detected, based on the detected motion vector according to the motion vector information D21 and the compensation control signal D22.

That is, as shown in FIG. 17(B), the image shifting circuit 24 shifts the pixels of the fields 1a', 1a", and 1a''' of the four-frame-delayed quad-speed video signal S25 as the current fields, from which the movement is detected, by ¼×A, ²⁄₄×A, and ¾×A, respectively, and gives the resultants to an averaging unit 29 of the later stage. The image reverse-shifting circuit 28 shifts the pixels of the fields 1b', 1b", and 1b''' of the two-frame-delayed quad-speed video signal S24 as the reference fields, from which the movement is detected, by −¾×A, −²⁄₄×A, and −¼×A, respectively, and gives the resultants to the averaging unit 29 of the later stage.

In this way, the image shifting circuit 24 and the image reverse-shifting circuit 28 sequentially shift the pixels of the four-frame-delayed quad-speed video signal S25 as the current fields and the two-frame-delayed quad-speed video signal S23 as the reference fields, according to the motion vector information D21 with time, and gives the resultants to the averaging unit 29.

As shown in FIG. 17(B), the first weighting unit 30 of the averaging unit 29 as a compensation means weights the pixel data of each pixel of the fields 1a, 1a', 1a", and 1a''' of the four-frame-delayed quad-speed video signal S25 by ½ and gives the resultants to a signal combination unit 32. In addition, the second weighting unit 31 weights the pixel data of each pixel of the fields 1b, 1b', 1b", and 1b''' of the two-frame-delayed quad-speed video signal S24 by ½ and gives the resultants to the signal combination unit 32.

In this way, the first weighting unit 30 and the second weighting unit 31 weight the pixel data of the pixels of the four-frame-delayed quad-speed video signal S25 as the current fields and the two-frame-delayed quad-speed video signal S24 as the reference fields, by ½, and gives the resultants to the signal combination unit 32.

The signal combination unit 32 combines the four-frame-delayed quad-speed video signal S25 and the two-frame-delayed quad-speed video signal S24, and outputs the created compensated quad-speed video signal S26 to a CRT not shown.

That is, as shown in FIG. 17(B), the signal combination unit 32 combines the weighted four-frame-delayed quad-speed video signal S25 and two-frame-delayed quad-speed video signal S24, thus taking the average of the pixel data of the shifted field 1a' and field 1b' that is two frames later, as a motion-compensated new field 1a', taking the average of the pixel data of the shifted field 1a" and field 1b" that is two frames later, as a motion-compensated new field 1a", and taking the average of the pixel data of the shifted field 1a''' and field 1b''' that is two frames later, as a motion-compensated new field 1a'''.

Thus the motion compensation device 21 shifts a current field and a reference field that is two frames later, in opposite directions with a motion vector between two-frame-separated frames detected by the motion vector detection circuit 25, and then weights and combines the resultants, thereby being capable of compensating the movement of an image between continuous fields of a quad-speed video signal so as to be smoother. Note that a process to be executed when the quad-speed video signal S23 is a film material will not be described.

A case of performing the motion compensation on a quad-speed video signal has been described. Similarly, the motion compensation can be applied to an N-time-speed video signal. That is, the motion vector detection circuit 25 of the motion compensation device 21 detects a motion vector between an original screen which is used to create N−1 pieces of interpolation screens, and an original screen (hereinafter, referred to as a reference screen) that is one later, to perform the motion compensation on the N−1 pieces of interpolation screens (that is, fields 1a' to 1a''', 1b' to 1b''', . . . ) which are created from the original screen (that is, fields 1a, 1b, . . . ) with the an N-time-speed conversion and are inserted between the original screen and the next original screen.

The image shifting circuit 24 serving as the image shifting means shifts an m-th interpolation screen (1≦m≦N−1) by m/N of the motion vector, and the image reverse-shifting circuit 28 shifts an m+N-th interpolation screen by −(N−m)/N of the motion vector. This technique is equivalent to a technique in which an interpolation screen is shifted at a ratio proportional to time from an original screen to an interpolation screen and a reference screen is shifted in an opposite direction at a ratio proportional to time from an interpolation screen to the reference screen because the ratio "m/N" to shift an interpolation screen is proportional to "time from original screen to interpolation screen/time from original screen to reference screen" and the ratio "(N−m)/N" to shift a reference screen is proportional to "time from interpolation screen to reference screen/time from original screen to reference screen".

Then the averaging unit 29 serving as the compensation means takes an image obtained by weighting by ½ and combining the pixel data of each pixel of a shifted m-th interpolation image and m+N-th interpolation image, as a motion-compensated m-th interpolation image.

According to the above configuration, the movement between fields in an N-time-speed video signal can be compensated so as to be smoother. Note that a motion vector can be detected between interpolation screens which are N-screens away from each other. However, since the interpolation screen is created from the original screen with the N-time-speed conversion, the motion vector detected between the original screen and the reference screen has better accuracy. Alternatively, instead of ½ weighting, by performing weighting by a value inversely proportional to the shift amount of a detection pixel, the movement between fields in the N-time-speed video signal can be compensated so as to be much smoother.

In addition, the pixel data of an m-th interpolation screen created with the N-time-speed conversion corresponds to the pixel data existing at the same position in the original screen, and the pixel data of an m+N-th interpolation screen corresponds to the pixel data existing at the same position of the reference screen. Therefore, to compensate the m-th ($1 \leq m \leq N-1$) interpolation screen, a signal obtained by shifting the position of the pixel data corresponding to the original screen by the image shifting circuit 24 and a signal obtained by shifting the position of the pixel data corresponding to the reference screen by the image reverse-shifting circuit 28 are given to the averaging unit 29. By doing so, the same results can be obtained.

In addition, the above embodiment has described a case of using a CRT as a display means. This invention, however, is not limited to this and movement between fields can be compensated so as to be smoother as well in a case where a static pixel device such as a liquid crystal panel, a plasma display panel, or an organic EL (Electro Luminescence) panel is used as a display means.

As described above, according to this invention, an image of a current field and an image of a reference field that is one frame or two frames later are shifted in opposite directions with a detected motion vector between frames, and combined and averaged, and the resultant is taken as a compensated field, thereby being capable of compensating the movement between fields so as to be much smoother than conventional cases.

In addition, by performing the weighted average inversely proportional to the shift amount of an image, the movement of an image between continuous fields can be compensated so as to be much smoother.

INDUSTRIAL APPLICABILITY

This invention can be applied to a video display device such as a television set.

The invention claimed is:

1. A motion compensation device comprising:
    motion vector detection means for detecting a motion vector between a detection pixel of a current field and a detection pixel of a reference field, from image information of the current field in a video signal obtained by performing double-speed conversion on a video signal and image information of the reference field that is one frame later than the current field;
    image shifting means for shifting the detection pixel of the current field by ½ of the motion vector and shifting the detection pixel of the reference field by –½ of the motion vector; and
    averaging means for performing motion compensation on the video signal of the current filed by weighting and combining pixel data of the detection pixel of the current field and pixel data of the detection pixel of the reference field shifted by the image shifting means.

2. The motion compensation device according to claim 1, wherein
    the averaging means performs weighting inversely proportional to a shift amount by the image shifting means and combining on the detection pixels.

3. The motion compensation device according to claim 1, wherein
    the motion vector detection means detects the motion vector with a block matching method for every block comprising a prescribed number of pixels.

4. A motion compensation device, comprising:
    motion vector detection means for detecting a motion vector between a detection pixel of a current field and a detection pixel of a reference field, from image information of the current field in a video signal obtained by performing telecine conversion and double-speed conversion on a film and image information of the reference field in a reference signal obtained by delaying the video signal by two frames;
    image shifting means for shifting detection pixels of three fields following the current field in the video signal by ¼, 2/4, and ¾ of the motion vector, respectively, and shifting detection pixels of three fields following the reference field in the reference video signal by –¾, –2/4, and –¼ of the motion vector, respectively; and
    averaging means for performing motion compensation on the video signal of the three fields following the current field by weighting and combining pixel data of the detection pixels of the three fields following the current field and pixel data of the detection pixels of the three fields following the reference field shifted by the image shifting means.

5. The motion compensation device according to claim 4, wherein
    the averaging means performs weighted average inversely proportional to a shift amount by the image shifting means, on each of the detection pixels.

6. The motion compensation device according to claim 4, wherein
    the motion vector detection means detects the motion vector with a block matching method for every block comprising a prescribed number of pixels.

7. A motion compensation method comprising:
    a motion vector detection step of detecting a motion vector between a detection pixel of a current field and a detection pixel of a reference field, from image information of the current field in a video signal obtained by performing double-speed conversion on a video signal and image information of the reference field that is one frame later than the current field;
    an image shifting step of shifting the detection pixel of the current field by ½ of the motion vector and shifting the detection pixel of the reference field by –½ of the motion vector; and
    an averaging step of performing motion compensation on the video signal of the current filed by weighting and combining pixel data of the detection pixel of the current field and pixel data of the detection pixel of the reference field shifted by the image shifting means.

8. The motion compensation method according to claim 7, wherein,
    in the averaging step, weighted average inversely proportional to a shift amount in the image shifting step is performed on each of the detection pixels.

9. The motion compensation method according to claim 7, wherein,
    in the motion vector detection step, the motion vector is detected with a block matching method for every block comprising a prescribed number of pixels.

10. A motion compensation method comprising:
    a motion vector detection step of detecting a motion vector between a detection pixel of a current field and a detection pixel of a reference field, from image information of the current field in a video signal obtained by performing telecine conversion and double-speed conversion on a film and image information of the reference field obtained by delaying the video signal by two frames;
    an image shifting step of shifting detection pixels of three fields following the current field in the video signal by ¼, 2/4, and ¾ of the motion vector, respectively, and shifting detection pixels of three fields following the reference field in the reference video signal by –¾, –2/4, and –¼ of the motion vector, respectively; and
    an averaging step of performing motion compensation on the video signal of the three fields following the current field by weighting and combining pixel data of the detection pixels of the three fields following the current field and pixel data of the detection pixels of the three fields following the reference field shifted by the image shifting means.

11. The motion compensation method according to claim 10, wherein,
in the averaging step, weighted average inversely proportional to a shift amount by the image shifting means is performed on each of the detection pixels.

12. The motion compensation method according to claim 10, wherein,
in the motion vector detection step, the motion vector is detected with a block matching method for every block comprising a prescribed number of pixels.

13. A motion compensation device for performing motion compensation on an N-time-speed video signal subjected to N-time-speed conversion by inserting N−1 pieces of interpolation screens created from an original screen of a video signal between the original screen and a next original screen, the motion compensation device comprising:
motion vector detection means for detecting a motion vector between a detection pixel of the original screen and a detection pixel of a reference screen, from image information of the original screen and image information of the reference screen that is an original screen next to the original screen;
image shifting means for shifting by m/N of the motion vector a detection pixel of an m-th interpolation screen ($1 \leq m \leq N-1$) corresponding to the detection pixel of the original screen, and shifting by −(N−m)/N of the motion vector a detection pixel of an m+N interpolation screen corresponding to the detection pixel of the reference pixel;
compensation means for outputting, as the m-th interpolation screen motion-compensated, a resultant obtained by performing weighting by a value inversely proportional to a shift amount by the image shifting means and combining on pixel data of the detection pixel of the m-th interpolation screen and pixel data of the detection pixel of the m+N-th interpolation screen shifted by the image shifting means.

14. A motion compensation method for performing motion compensation on an N-time-speed video signal subjected to N-time-speed conversion by inserting N−1 pieces of interpolation screens created from an original screen of a video signal between the original screen and a next original screen, the motion compensation method comprising:
a motion vector detection step of detecting a motion vector between a detection pixel of the original screen and a detection pixel of a reference screen, from image information of the original screen and image information of the reference screen that is an original screen next to the original screen;
an image shifting step of shifting by m/N of the motion vector a detection pixel of an m-th interpolation screen ($1 \leq m \leq N-1$) corresponding to the detection pixel of the original screen, and shifting by −(N−m)/N of the motion vector a detection pixel of an m+N interpolation screen corresponding to the detection pixel of the reference pixel; and
a compensation step of outputting, as the m-th interpolation screen motion-compensated, a resultant obtained by performing weighting by a value inversely proportional to a shift amount in the image shifting step and combining on pixel data of the detection pixel of the m-th interpolation screen and pixel data of the detection pixel of the m+N-th interpolation screen shifted in the image shifting step.

15. A motion compensation device for compensating movement of an image signal of new N−1 pieces of interpolation screens inserted between an original screen of a video signal and a next original screen, the motion compensation device comprising:
motion vector detection means for detecting a motion vector between a detection pixel of the original screen and a detection pixel of a reference screen, from image information of the original screen and image information of the reference screen that is an original screen next to the original screen;
image shifting means for shifting a position of pixel data corresponding to the detection pixel of the original screen by m/N of the motion vector and shifting a position of pixel data corresponding to the detection pixel of the reference screen by −(N−m)/N when an m-th ($1 \leq m \leq N-1$) interpolation screen is compensated; and
compensation means for compensating the image signal of the interpolation screens by performing prescribed weighting and combining on pixel data corresponding to the detection pixel of the original screen and pixel data corresponding to the detection pixel of the reference screen shifted by the image shifting means.

16. The motion compensation device according to claim 15, wherein
the compensation means performs the prescribed weighting and combining based on a shift amount of the position of the pixel data corresponding to the detection pixels of the original screen and the reference screen.

17. The motion compensation device according to claim 16, wherein
the compensation means performs weighting inversely proportional to a shift amount by the image shifting means, on pixel data corresponding to the detection pixels of the original screen and the reference screen.

18. The motion compensation device according to claim 16, wherein
the compensation means performs weighting by (N−m)/N on pixel data corresponding to the detection pixel of the original screen and weighting by m/N on pixel data corresponding to the detection pixel of the reference screen.

19. A motion compensation method for compensating movement of an image signal of new N−1 pieces of interpolation screens inserted between an original screen of a video signal and a next original screen, the motion compensation method comprising:
a motion vector detection step of detecting a motion vector between a detection pixel of the original screen and a detection pixel of a reference screen, from image information of the original screen and image information of the reference screen that is an original screen next to the original screen;
an image shifting step of shifting a position of pixel data corresponding to the detection pixel of the original screen by m/N of the motion vector and shifting a position of pixel data corresponding to the detection pixel of the reference screen by −(N−m)/N when an m-th ($1 \leq m \leq N-1$) interpolation screen is compensated; and
a compensation step of compensating the image signal of the interpolation screens by performing prescribed weighting and combining on pixel data corresponding to the detection pixel of the original screen and pixel data corresponding to the detection pixel of the reference screen shifted in the image shifting step.

* * * * *

UNITED STATES PATENT AND TRADEMARK OFFICE
CERTIFICATE OF CORRECTION

PATENT NO. : 7,425,990 B2 Page 1 of 1
APPLICATION NO. : 10/521304
DATED : September 16, 2008
INVENTOR(S) : Takaya Hoshino et al.

It is certified that error appears in the above-identified patent and that said Letters Patent is hereby corrected as shown below:

Title page item (54) and Col. 1, line 1,

Please correct to read from "MOTION CORRECTION DEVICE AND METHOD" to

--MOTION COMPENSATION DEVICE AND METHOD--.

Signed and Sealed this

Sixteenth Day of December, 2008

JON W. DUDAS
*Director of the United States Patent and Trademark Office*